(12) United States Patent
Bridges

(10) Patent No.: US 8,947,678 B2
(45) Date of Patent: Feb. 3, 2015

(54) METHOD FOR CORRECTING THREE-DIMENSIONAL MEASUREMENTS OF A SPHERICALLY MOUNTED RETROREFLECTOR

(71) Applicant: FARO Technologies, Inc., Lake Mary, FL (US)

(72) Inventor: Robert E. Bridges, Kennett Square, PA (US)

(73) Assignee: FARO Technologies, Inc., Lake Mary, FL (US)

( * ) Notice: Subject to any disclaimer, the term of this patent is extended or adjusted under 35 U.S.C. 154(b) by 0 days.

(21) Appl. No.: 14/102,869

(22) Filed: Dec. 11, 2013

(65) Prior Publication Data

US 2014/0098381 A1   Apr. 10, 2014

(51) Int. Cl.
*G01B 11/14* (2006.01)
*G01B 11/00* (2006.01)
*G01B 11/02* (2006.01)

(52) U.S. Cl.
CPC .............. *G01B 11/002* (2013.01); *G01B 11/00* (2013.01); *G01B 11/02* (2013.01); *G01B 11/005* (2013.01)
USPC .......................................... 356/614; 356/623

(58) Field of Classification Search
USPC .................................. 356/600–640
See application file for complete search history.

(56) References Cited

U.S. PATENT DOCUMENTS

| 4,714,339 | A  | * | 12/1987 | Lau et al. ..................... 356/4.09 |
| 7,352,446 | B2 | * | 4/2008  | Bridges et al. ............... 356/5.13 |
| 7,358,516 | B2 | * | 4/2008  | Holler et al. ............. 250/559.33 |
| 7,583,375 | B2 | * | 9/2009  | Cramer et al. ................ 356/154 |
| 7,701,559 | B2 |   | 4/2010  | Bridges et al. |
| 7,800,758 | B1 | * | 9/2010  | Bridges et al. ............... 356/482 |
| 7,804,602 | B2 | * | 9/2010  | Raab ............................ 356/614 |
| 8,467,072 | B2 | * | 6/2013  | Cramer et al. ................ 356/620 |
| 8,619,265 | B2 | * | 12/2013 | Steffey et al. ................ 356/614 |
| 2011/0023578 | A1 | * | 2/2011 | Grasser ......................... 73/1.75 |
| 2011/0112786 | A1 | * | 5/2011 | Desforges et al. ............. 702/95 |
| 2014/0098383 | A1 | * | 4/2014 | Bridges ........................ 356/614 |

OTHER PUBLICATIONS

Performance Evaluation of Laser-Based Spherical Coordinate Measurement Systems; ASME B89.4.19-2006; Non-Mandatory Appendix B—Spherically Mounted Retroreflector (SMR) Tests, p. 22; The American Society of Mechanical Engineers; Copyright 2006.

* cited by examiner

*Primary Examiner* — Kara E Geisel
*Assistant Examiner* — Jarreas C Underwood
(74) *Attorney, Agent, or Firm* — Cantor Colburn LLP

(57) ABSTRACT

A method of measuring spherically mounted retroreflector (SMR) with a 3D coordinate measurement device such as a laser tracker. The SMR includes an open-air cube corner retroreflector having a vertex point located near a sphere center of the SMR. Measurements of the SMR to the vertex point are moved to the SMR sphere center by accounting for SMR depth error and SMR runout error.

34 Claims, 27 Drawing Sheets

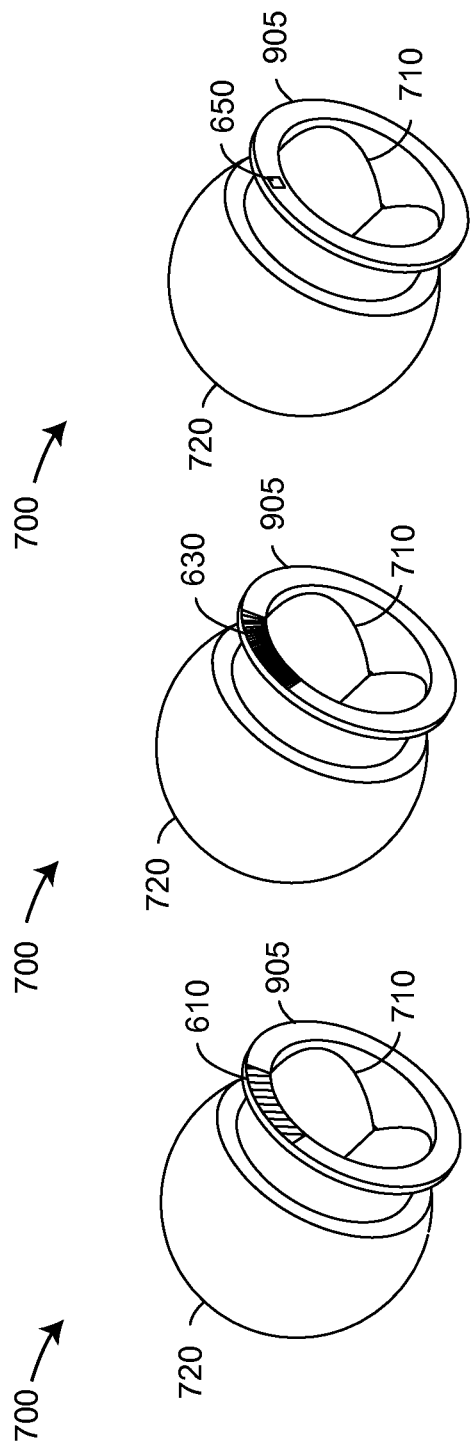

FRONT VIEW

SIDE SECTION A-A VIEW

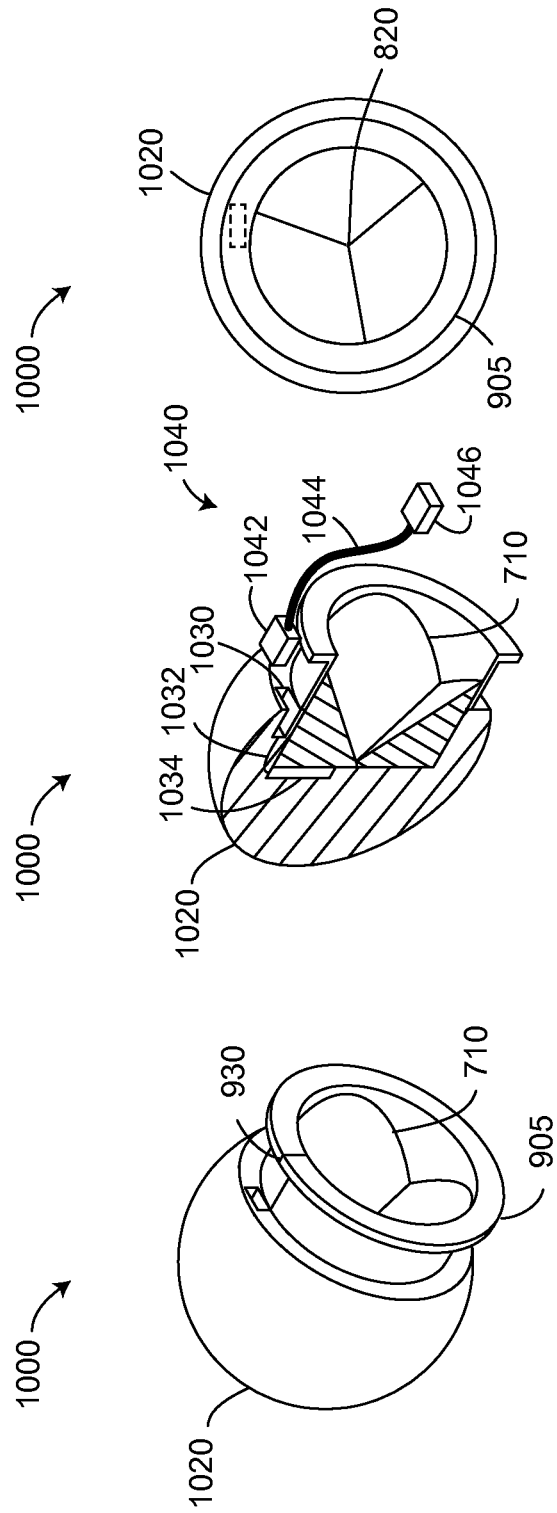

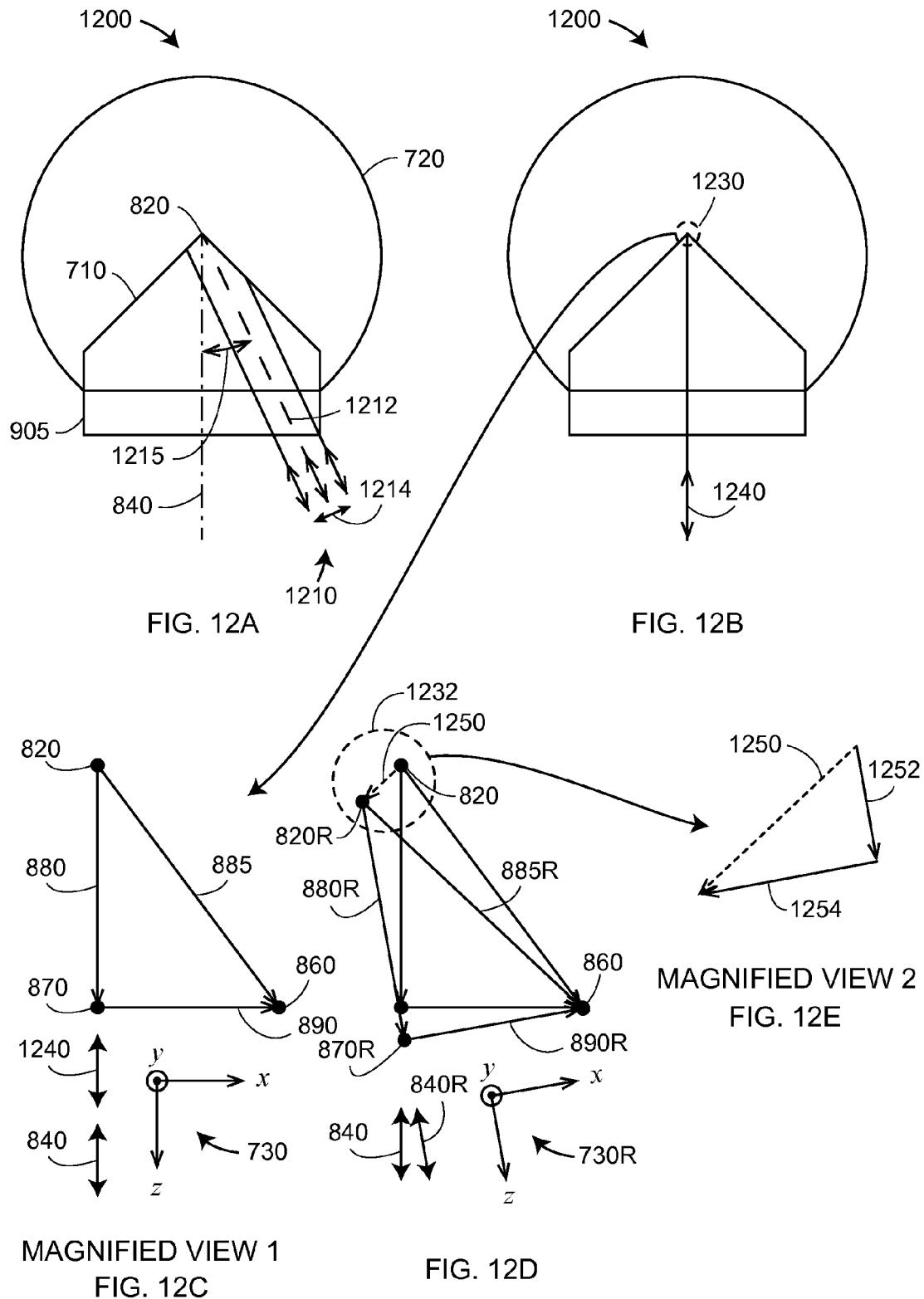

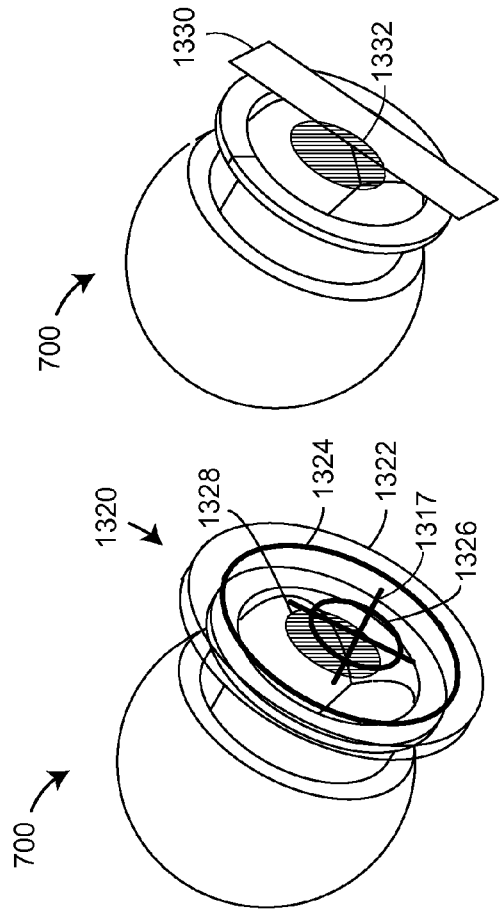
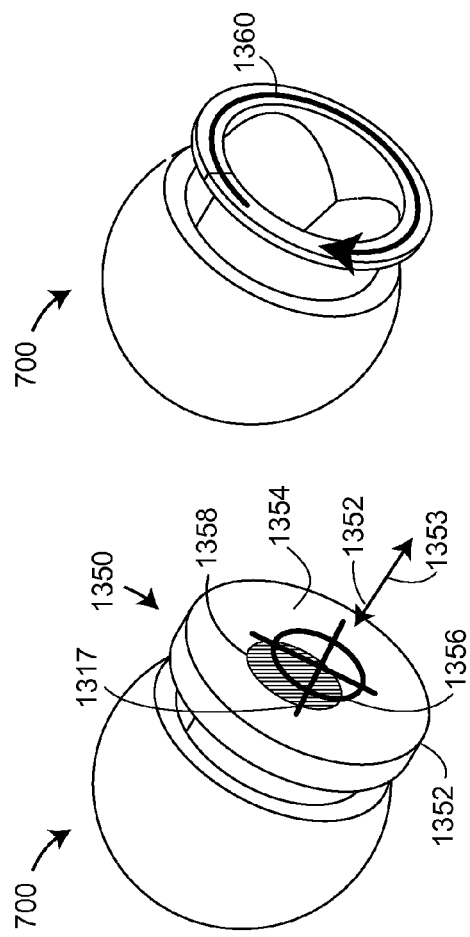

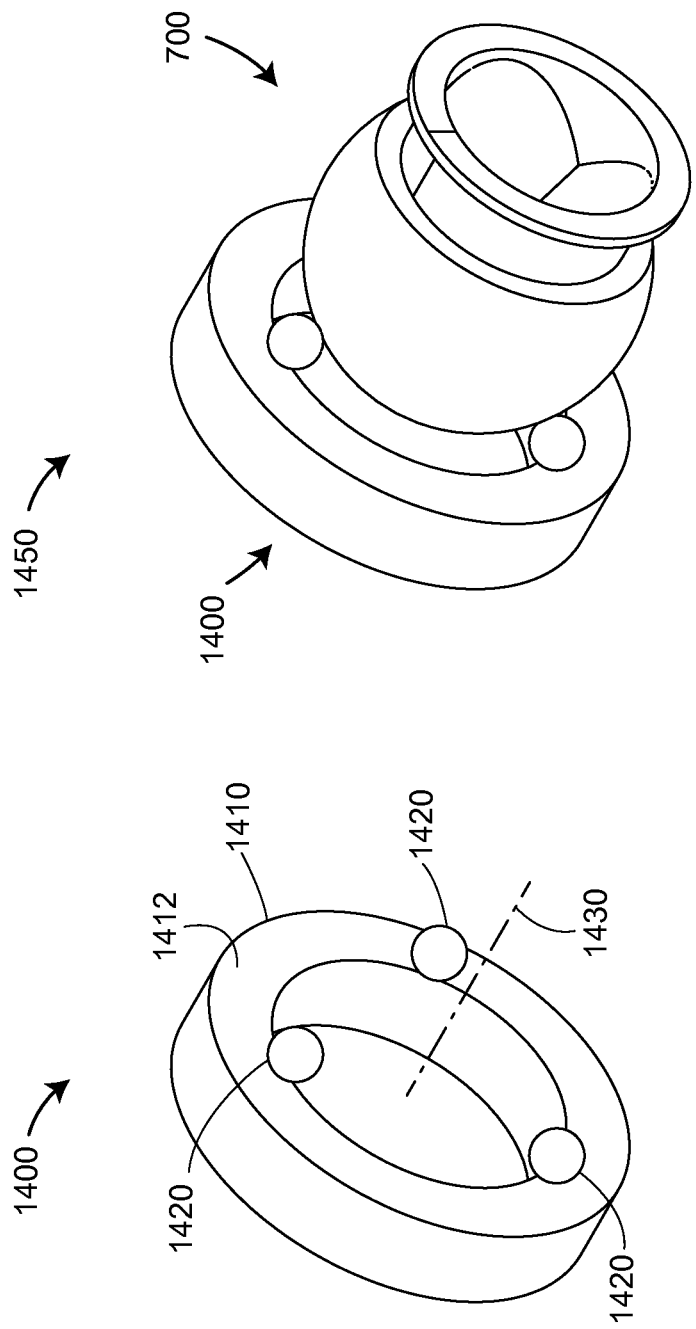

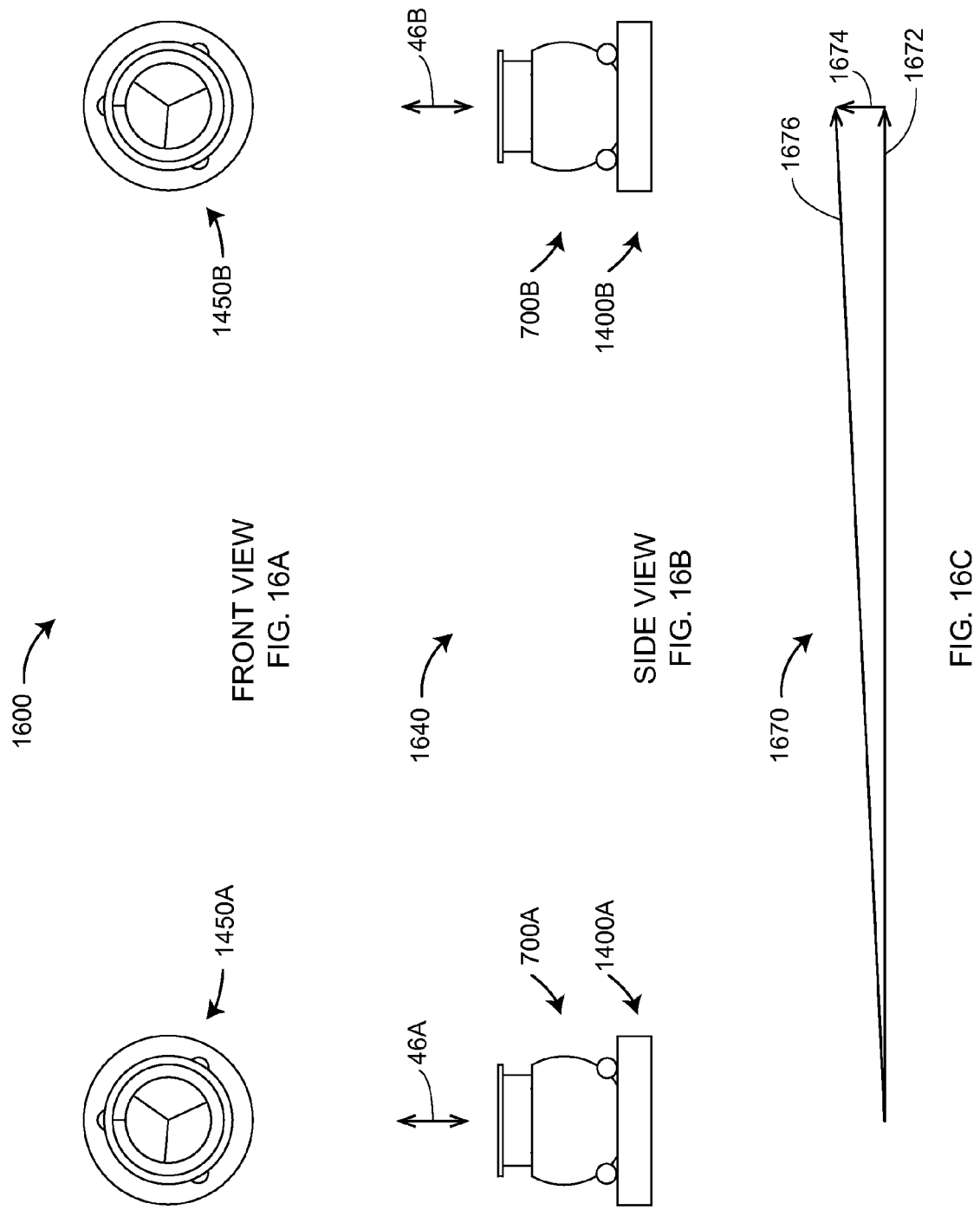

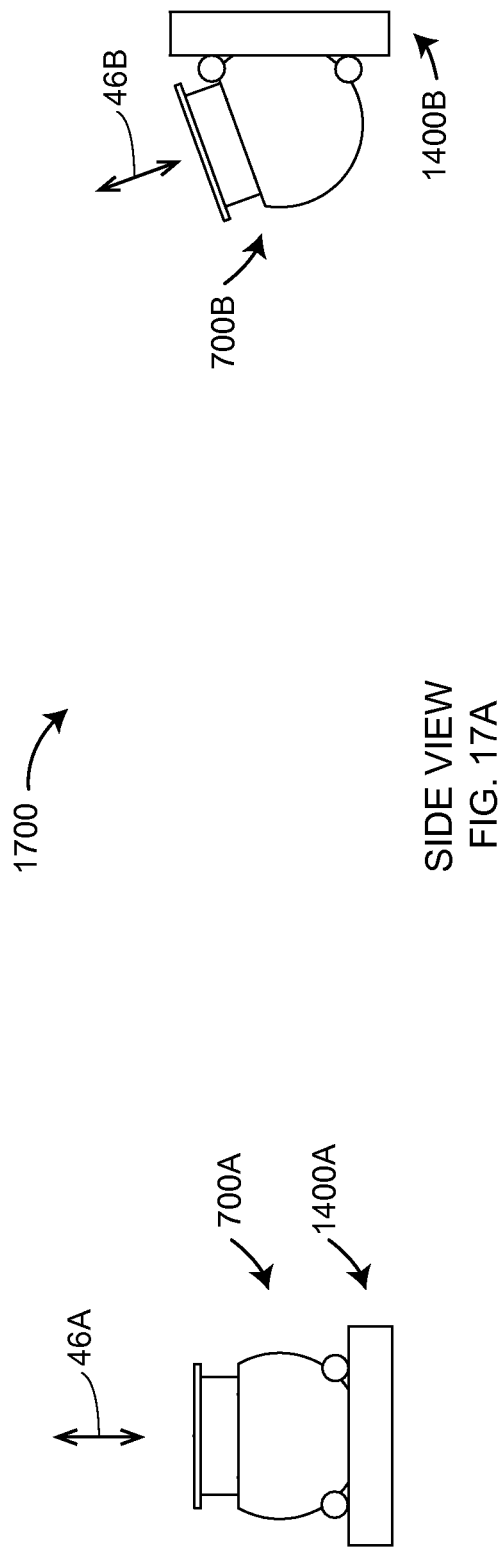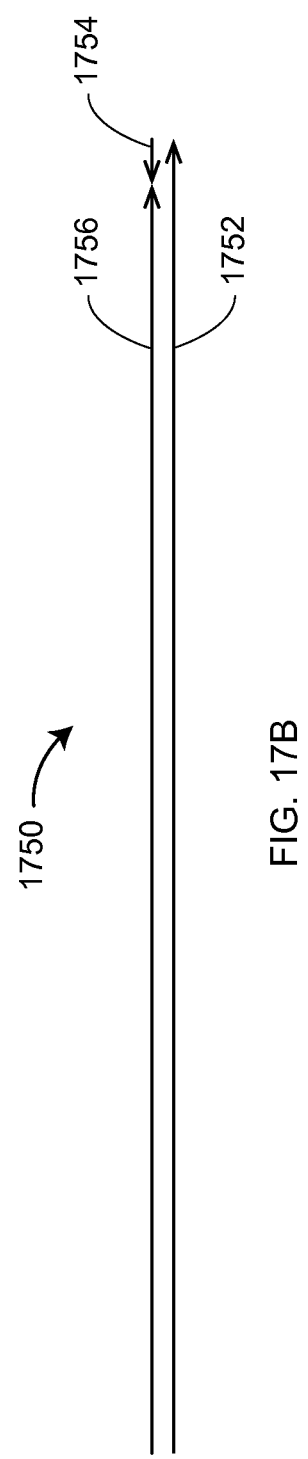

FRONT VIEW

FRONT VIEW

FRONTSIGHT

BACKSIGHT

FRONTSIGHT HOME

FRONTSIGHT

BACKSIGHT

METHOD FOR CORRECTING THREE-DIMENSIONAL MEASUREMENTS OF A SPHERICALLY MOUNTED RETROREFLECTOR

FIELD OF INVENTION

The present invention relates in general to methods for measuring spherically mounted retroreflectors (SMRs) and in particular to methods for determining surface coordinates and three-dimensional distances based on measurements of SMRs.

BACKGROUND

There is a class of instruments that measures the coordinates of a point by sending a laser beam to a retroreflector target in contact with the point. The instrument determines the coordinates of the point by measuring the distance and the two angles to the target. The distance is measured with a distance-measuring device such as an ADM or an interferometer. The angles are measured with an angle-measuring device such as an angular encoder. A gimbaled beam-steering mechanism within the instrument directs the laser beam to the point of interest.

The laser tracker is a particular type of coordinate-measuring device that tracks the retroreflector target with one or more laser beams it emits. There is another category of instruments known as total stations or tachymeters that may measure a retroreflector or a point on a diffusely scattering surface. Laser trackers, which typically have accuracies on the order of a thousand of an inch and as good as one or two micrometers under certain circumstances, are usually much more accurate than total stations. The broad definition of laser tracker, which includes total stations, is used throughout this application.

Ordinarily the laser tracker sends a laser beam to a retroreflector target. A common type of retroreflector target is the SMR. In most cases, the term SMR is applied to a cube-corner retroreflector embedded within a metal sphere. However, the term SMR may also be applied to a cateye retroreflector embedded with a metal exterior spherical portion. Such a cateye retroreflector may be constructed in a shape of a sphere or in the shape of two adjoining hemispheres. A cube-corner retroreflector includes three mutually perpendicular reflectors. The vertex, which is the common point of intersection of the three reflectors, is located near the center of the sphere. In its normal tracking mode, the laser tracker sends a beam of light from the tracker to a position near the vertex of the SMR. As long as the beam of light strikes the vertex, the beam of returning beam of light retraces the path of the outgoing beam of light back to the tracker. If the beam of light strikes the SMR slightly off the vertex, the beam of light will return parallel to, but not exactly coincident with, the outgoing beam of light. A servo system within the tracker adjusts the direction of the beam emitted by the tracker to bring it back to the center, thereby allowing the beam to follow a moving retroreflector. Because the vertex is nearly coincident with the sphere center of the SMR, the perpendicular distance from the vertex to any surface on which the SMR rests remains nearly constant, even as the SMR is rotated. Consequently, the laser tracker can measure the 3D coordinates of a surface to a relatively high accuracy by following the position of an SMR as it is moved over the surface. Stating this another way, the laser tracker needs to measure only three degrees of freedom (one radial distance and two angles) to characterize the 3D coordinates of a surface.

An SMR may also be used to measure the distance between two nests. A particularly useful kind of nest is a kinematic nest, which has the property that an SMR can be repeatably positioned in the nest. One type of nest makes contact with the SMR surface at three points. Some types of nests are magnetic nests that hold the SMR securely in place against the nest contact points.

Some laser trackers have the ability to measure six degrees of freedom (DOF), which may include three translations, such as x, y, and z, and three rotations, such as pitch, roll, and yaw. An exemplary six-DOF laser tracker system is described in U.S. Pat. No. 7,800,758 ('758) to Bridges, et al., incorporated by reference herein. The '758 patent discloses a probe that holds a cube corner retroreflector, onto which marks have been placed. The cube corner retroreflector is illuminated by a laser beam from the laser tracker, and the marks on the cube corner retroreflector are captured by an orientation camera within the laser tracker. The three orientational degrees of freedom, for example, the pitch, roll, and yaw angles, are calculated based on the image obtained by the orientation camera. The laser tracker measures a distance and two angles to the vertex of the cube-corner retroreflector. When the distance and two angles, which give three translational degrees of freedom of the vertex, are combined with the three orientational degrees of freedom obtained from the orientation camera image, the position of a probe tip, arranged at a prescribed position relative to the vertex of the cube corner retroreflector, can be found. Such a probe tip may be used, for example, to measure the coordinates of a "hidden" feature that is out of the line of sight of the laser beam from the laser tracker.

As explained hereinabove, the vertex of a cube corner retroreflector within an SMR is ideally placed at the exact center of the sphere into which the cube corner is embedded. In practice, the position of the vertex is off the center of the sphere by up to a few thousandths of an inch. In some cases, the difference in the positions of the vertex and the sphere center are known to high accuracy, but this data is not used to correct the tracker readings. In the accurate measurements made with laser trackers, this error in the centering of the cube corner retroreflector in the sphere is sometimes larger than the errors from the distance and angle meters within the laser tracker. Consequently, there is a need for a method to correct this centering error.

Most of the SMRs in use today contain open-air cube corner retroreflectors. There are some SMRs that use glass cube corner retroreflectors, but in most cases these have limited accuracy. Because of the bending of the light entering such glass cube corners, the light appears to travel in a direction that is not the true direction within the cube corner. Consequently, SMRs made with glass cube corners tend to be made very small, as this reduces error, and they tend to be used in applications where the highest accuracy is not required. A method for minimizing this error using a six-DOF laser tracker is given in U.S. Pat. No. 8,467,072, the contents of which are incorporated by reference.

In many cases, the SMR of interest is an open-air cube corner rather than a glass cube corner, and the laser tracker measures only three degrees of freedom rather than six. Measurement error associated with such an SMR and tracker combination result both from errors in vertex centering and in sphere diameter. These errors can be corrected to an extent by purchasing a more expensive SMR having smaller centering and radius errors, but the errors cannot be eliminated. Furthermore, expensive SMRs are cost prohibitive in many applications. There is a need for a method to correct these errors, even for relatively inexpensive SMRs.

SUMMARY

According to one aspect of the invention, a method is provided for measuring a spherically mounted retroreflector (SMR) with a device, the method comprising the steps of providing a first SMR, the first SMR including a first body and a first retroreflector, the first SMR including a first reference point, the first body having a first spherical exterior portion that has a first sphere center and a first sphere radius, the first body containing a first cavity, the first cavity sized to hold the first retroreflector, the first cavity open to a region outside the first body, the first retroreflector at least partially disposed in the first cavity, the first retroreflector being an open-air cube-corner retroreflector, the first retroreflector having a first set of three mutually perpendicular planar reflectors that intersect in a first set of three lines and in a common first vertex point, the first cavity including an air-filled region interior to reflecting surfaces of the first set of three planar reflectors, the first retroreflector having a first axis of symmetry relative to the first set of three lines, the first SMR having a first SMR runout plane perpendicular to the first axis of symmetry and passing through the first sphere center, the first SMR having a first SMR intersection point, the first SMR intersection point being a point of intersection of the first axis of symmetry with the first SMR runout plane, the first SMR having a first error vector extending from the first vertex point to the first sphere center, the first SMR error vector having a first SMR depth error vector component and a first SMR runout error vector component, the first SMR depth error vector component being a vector that extends from the first vertex point to the first SMR intersection point, the first SMR runout error vector component being a vector that extends from the first SMR intersection point to the first sphere center, the first SMR depth error vector component having a magnitude equal to a first SMR depth error; providing the device, wherein the device has a device frame of reference fixed with respect to a base of the device and a light source that emits a first beam of light, the device being configured to measure a target distance and two target angles from the device to the first vertex point, the two target angles given with respect to the base; providing a processor and a memory; providing computer readable media having computer readable instructions which when executed by the processor calculates first three-dimensional (3D) coordinates of the first sphere center in the device frame of reference; determining the first SMR depth error and the first SMR runout error vector component; storing as first stored values the first SMR depth error and a numerical representation of the first SMR runout error vector component; reading by the processor the first stored values; and performing a first measurement, the first measurement including steps A through J: A) providing a rule for orienting the first SMR to obtain a first preferred orientation of the first SMR; B) determining, by the operator, the first preferred orientation of the first SMR based at least in part on the rule; C) orienting, by the operator, the first SMR in the first preferred orientation, the first preferred orientation based at least in part on the first reference point and on the axis of symmetry; D) determining by the processor the first preferred orientation in the device frame of reference based at least in part on the rule; E) sending the first beam of light from the light source to the first vertex point in a first beam direction and in response receiving at the device a first reflected light; F) measuring, from the device to the first vertex point, a first target distance and a first set of the two target angles based at least in part on the first reflected light, the first target distance further based at least in part on a speed of light over a path traveled by the first beam of light; G) determining the first beam direction in the device frame of reference based at least in part on the first set of the two target angles; H) determining with the processor 3D coordinates of the first vertex point in the device frame of reference based at least in part on the first target distance and the first set of the two target angles; I) executing by the processor the computer readable instructions, the computer readable instructions performing a mathematical transformation of the 3D coordinates of the first vertex point to obtain the 3D coordinates of the first sphere center in the device frame of reference, the mathematical transformation including translating the 3D coordinates of the first vertex point along the first beam direction by the first SMR depth error and along a direction perpendicular to the first beam direction, the translating along the direction perpendicular to the first beam direction being based at least in part on the first beam direction, the numerical representation of the first SMR runout error vector component, and the first preferred orientation of the first SMR; and J) storing the 3D coordinates of the first sphere center.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which:

FIGS. 6A-C are perspective views of the SMRs to which have been added a reflective region, a barcode pattern or serial number, and an RF identification tag, respectively, according to embodiments;

FIGS. 10A, 10C are perspective and front views, respectively, of an SMR that provides a connector socket, and FIG. 10B is a cross-sectional view of an SMR showing a temperature sensor configured for electrical connection to connector cable, also shown, according to an embodiment;

FIGS. 12A-E are schematic illustrations of the errors resulting from the misalignment of the axis of symmetry of an SMR with the beam of light from a 3D measurement device;

FIGS. 13A-13F are perspective and schematic representations of alternative methods for aligning an axis of symmetry of an SMR with a beam of light from a 3D measurement device according to an embodiment;

FIG. 14A shows a kinematic nest and support axis, and FIG. 14B shows a kinematic nest receiving an SMR;

FIGS. 16A, 16B show front and side views of SMRs held by kinematic nests, respectively, and FIG. 16C shows that errors in the SMR radius do not significantly affect a measured length;

FIG. 17A shows side views of SMRs held by kinematic nests with one of the nests perpendicular to a desired measurement direction, and FIG. 17B shows that errors may be significant for this case;

DETAILED DESCRIPTION OF THE PREFERRED EMBODIMENTS

Figure 1:
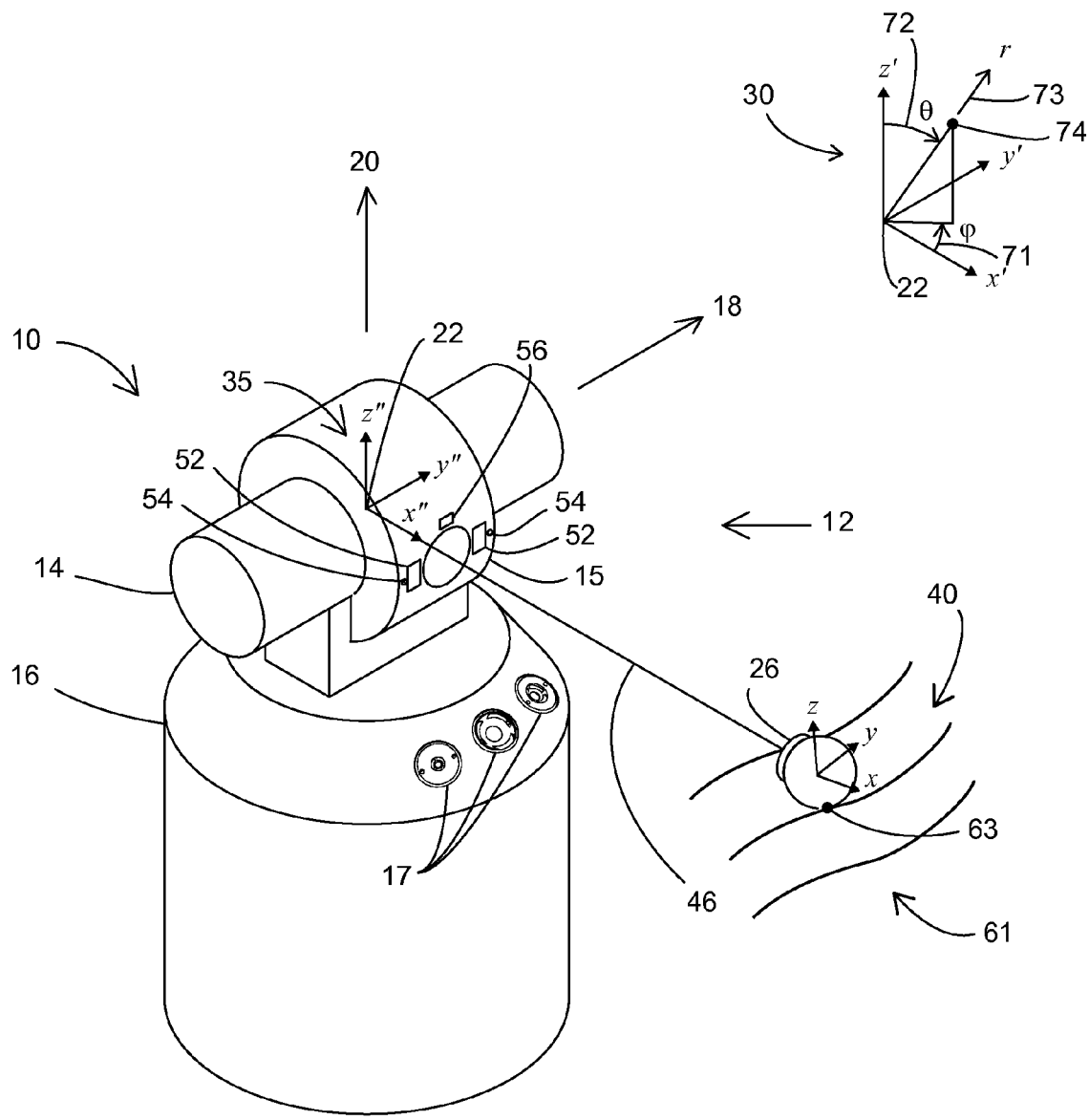
FIG. 1 is a perspective view of a laser tracker and an SMR according to an embodiment.

An exemplary laser tracker 10 is illustrated in FIG. 1. An exemplary gimbaled beam-steering mechanism 12 of laser tracker 10 includes zenith carriage 14 mounted on azimuth base 16 and rotated about azimuth axis 20. Payload 15 is mounted on zenith carriage 14 and rotated about zenith axis 18. Zenith mechanical rotation axis (not shown) and azimuth mechanical rotation axis (not shown) intersect orthogonally, internally to tracker 10, at gimbal point 22, which is typically the origin for distance measurements. Laser beam 46 virtually passes through gimbal point 22 and is pointed orthogonal to zenith axis 18. In other words, laser beam 46 is in a plane normal to zenith axis 18. Laser beam 46 is pointed in the desired direction by motors within the tracker (not shown) that rotate payload 15 about zenith axis 18 and azimuth axis 20. Zenith and azimuth angular encoders, internal to the tracker (not shown), are attached to zenith mechanical axis (not shown) and azimuth mechanical axis (not shown) and indicate, to relatively high accuracy, the angles of rotation. Laser beam 46 travels to external retroreflector 26 such as the SMR described above. By measuring the radial distance between gimbal point 22 and retroreflector 26 and the rotation angles about the zenith and azimuth axes 18, 20, the position of retroreflector 26 is found within the spherical coordinate system of the tracker.

The device frame of reference 30 of the laser tracker 10 is fixed with respect to the azimuth base 16, which is typically stationary with respect to the tracker's surroundings. The device frame of reference 30 may be represented in a variety of coordinate systems. It may be represented in a Cartesian coordinate system having three perpendicular axes x', y', and z'. It may be represented in a spherical coordinate system, a point 74 being represented by a radial distance 73 (r), a first (zenith) angle 72 ($\theta$), and a second (azimuth) angle 71 ($\phi$). The angle $\theta$ is obtained by using the projection of the point 74 onto the z axis. The angle $\phi$ is obtained by using the projection of the point 74 onto the x'-y' plane. The laser tracker 10 inherently measures in a spherical coordinate system using one distance meter to measure r and two angular encoders to measure $\theta$ and $\phi$. However, a point measured in spherical coordinates may be easily converted to Cartesian coordinates. In an embodiment, the gimbal point 22 is selected as the origin. Other coordinate systems are possible and may be used.

The laser tracker 10 also includes rotating frames of reference. One of the rotating frames of reference is the payload frame of reference 35 that aims the beam of light 46 toward the SMR 26. The payload frame of reference rotates about the axis 20 and the axis 18. It should be understood that the term payload frame of reference may refer to the final beam delivery portion of any type of beam delivery system, not just the payload 15 of FIG. 1. For example, the payload 15 may be replaced by a minor that reflects the beam of light 46 toward the SMR 26. The payload frame of reference 35 may be represented in a Cartesian coordinate system having three perpendicular axes x", y", and z" as shown in FIG. 1. In an exemplary payload frame of reference, the x" axis points in the direction of the outgoing laser beam 46, the y" axis points in the direction of the zenith axis 18, and the z" axis points in a direction perpendicular to the x" and y" axes. The y"-z" plane is perpendicular to the direction x" of the laser beam. In an embodiment, the gimbal point 22 is the origin of the payload frame of reference 35.

The SMR 26 has an SMR frame of reference 40. The SMR frame of reference may be represented, for example, in a Cartesian coordinate system having three perpendicular axes x, y, and z. The x, y, and z axes of the SMR frame of reference 40 move with the SMR 26 and are not in general parallel to the corresponding axes x", y", and z" of the payload frame of reference 35. In an embodiment, a vertex of a cube corner retroreflector within the SMR is the origin of the SMR frame of reference. The SMR 26 may be placed in contact with the workpiece surface 61 at a point 63. To find the three-dimensional (3D) coordinates of the point 63, the tracker first determines the 3D coordinates of the vertex of the SMR 26 using the distance and two angles it has measured. It then shifts the 3D coordinates of the SMR vertex toward the surface by an amount equal to the sphere radius of the SMR. The SMR 26 may also be used to measure 3D coordinates when placed on a kinematic nest, as further explained hereinbelow.

Laser beam 46 may include one or more laser wavelengths, or the beam 46 may be a beam of light other than laser light. For the sake of clarity and simplicity, a steering mechanism of the sort shown in FIG. 1 is assumed in the following discussion. However, other types of steering mechanisms are possible. For example, it would be possible to reflect a laser beam off a minor rotated about the azimuth and zenith axes. The techniques described here are applicable, regardless of the type of steering mechanism.

In exemplary laser tracker 10, locator cameras 52, 56 and light sources 54 are located on payload 15. Light sources 54 illuminate one or more retroreflector targets 26. In an embodiment, light sources 54 are LEDs electrically driven to repetitively emit pulsed light. Each locator camera 52 and 56 includes a photosensitive array and a lens placed in front of the photosensitive array. The photosensitive array may be a CMOS or CCD array, for example. In an embodiment, the lens of locator camera 52 has a relatively wide field of view, for example, 30 or 40 degrees. In contrast, the lens of locator camera 56 may have a relatively narrow field of view, for example, to enable clear reading of a bar code or a serial number of an SMR 26 held in a home nest 17, as discussed further hereinbelow. The purpose of the lens in a camera 52, 56 is to form an image on the photosensitive array of objects within the field of view of the lens. The image on the photosensitive array is sent to electronics, which may be internal or external to the photosensitive array, to provide an electrical signal to a processor. The electrical signal is evaluated by the processor to extract relevant information such as images, text, array locations, and so forth. Usually at least one light source 54 is placed near a locator camera 52 so that light from light source 54 is reflected off each retroreflector target 26 onto the locator camera 52. In this way, retroreflector images are readily distinguished from the background on the photosensitive array as their image spots are brighter than background objects and are pulsed. In an embodiment, there are two locator cameras 52 and two light sources 54 placed about the line of laser beam 46. By using two locator cameras 52 in this way, the principle of triangulation can be used to find the three dimensional coordinates of any SMR within the field of view of the locator camera. In addition, the three dimensional coordinates of an SMR can be monitored as the SMR is moved from point to point.

For a locator camera 56 designed to read bar codes, a light source is not placed close to the camera as the bright flash of retroreflected light would prevent the camera from reading the much dimmer lines of a bar code. Instead, the lights 54, which are too far away from the locator camera 56 to retroreflect the light from the retroreflector target 26 into the locator camera 56, may be used to illuminate the bar codes, if needed.

Figure 2:
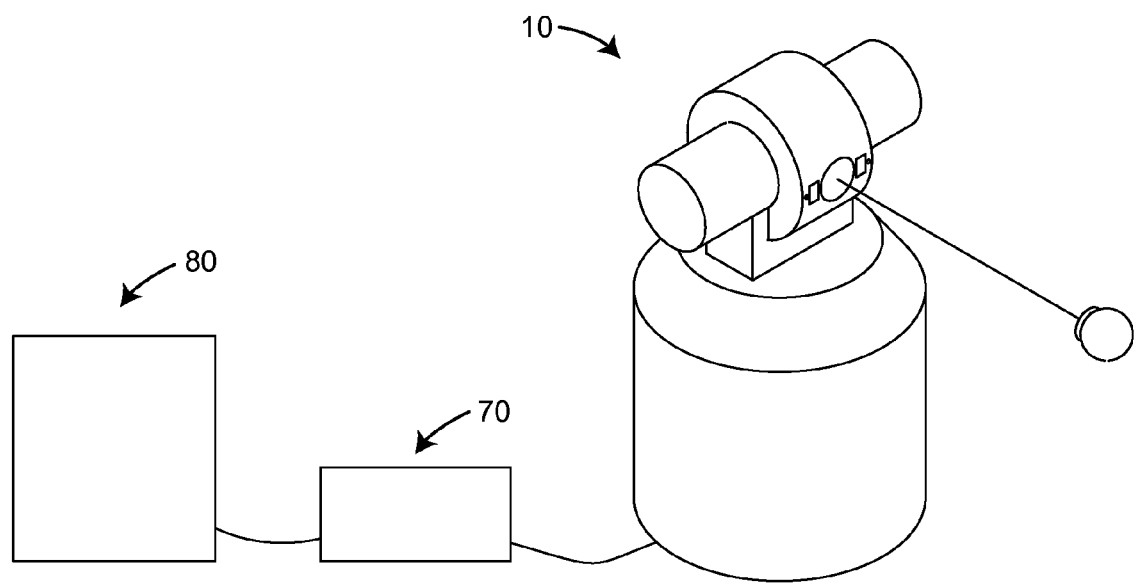
FIG. 2 is an illustration of a laser tracker, an auxiliary unit, and an external computer according to an embodiment.

As shown in FIG. 2, auxiliary unit 70 may be a part of laser tracker 10. The purpose of auxiliary unit 70 is to supply electrical power to the laser tracker body and in some cases to also supply computing and clocking capability to the system. It is possible to eliminate auxiliary unit 70 altogether by moving the functionality of auxiliary unit 70 into the tracker body. In most cases, auxiliary unit 70 is attached to general purpose computer 80. Application software loaded onto general purpose computer 80 may provide application capabilities such as reverse engineering. It is also possible to eliminate general purpose computer 80 by building its computing capability directly into laser tracker 10. In this case, a user interface, possibly providing keyboard and mouse functionality may be built into laser tracker 10. The connection between auxiliary unit 70 and computer 80 may be wireless or through a cable of electrical wires. Computer 80 may be connected to a network, and auxiliary unit 70 may also be connected to a network. Plural instruments, for example, multiple measurement instruments or actuators, may be connected together, either through computer 80 or auxiliary unit 70. In an embodiment, auxiliary unit 70 is omitted and connections are made directly between laser tracker 10 and computer 80.

The laser tracker 10 measures a distance r using either an interferometer or an ADM. It measures an azimuth angle $\phi$ and a zenith angle $\theta$ using angular encoders. Hence the laser tracker measures in a spherical coordinate system, although the coordinate values for any measured point may be converted into coordinates in any other desired coordinate system, for example, the Cartesian coordinate system 30 of FIG. 1.

It should be similarly understood that three degrees of translational freedom means three independent degrees of translational freedom. Another way of saying this is that the three directions corresponding to the three degrees of translational freedom form a basis set in three-dimensional space. In other words, each of the three directions corresponding to a degree of translational freedom has a component orthogonal to each of the other two directions.

Figure 3:
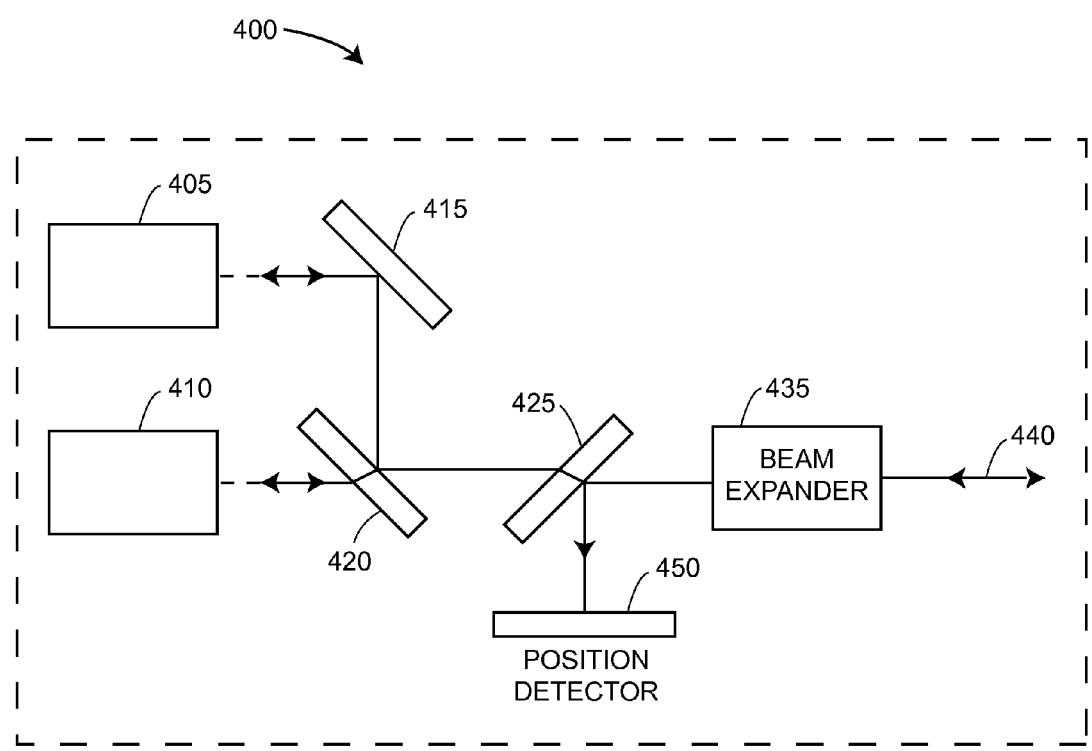
FIG. 3 is a block diagram showing elements in the payload of a laser tracker according to an embodiment.

FIG. 3 shows an embodiment for electro-optical assembly 400 of the laser tracker 10. Source elements 405 and 410 represent light sources and possibly additional electrical and optical components. For example, source element 410 may represent a red helium-neon laser in combination with an interferometer. Source element 405 may represent an infrared laser in combination with an ADM. Alternatively, the system may have only an interferometer or only an ADM. One of the source elements 405 or 410 may have only a source of light without a distance meter. There may be additional light sources (not shown) besides those contained within source elements 405 and 410. The source elements 405 and 410 may be located in payload 15 or they may be located in one of the other parts of the tracker such as the zenith carriage 14 or azimuth base 16. The light source may be located in one section, for example, the azimuth base, and the distance meter located in another section such as the payload 15. The light may be routed from one location to another by optical fibers, as explained in the '758 patent. Alternatively, the light from the source may be reflected off a mirror that is steered about the zenith axis, and the distance meters kept in the azimuth base 16. The light sources may include lasers, superluminescent diodes, light emitting diodes, or others.

Light from source element 410 passes through beam splitter 420. Light from source element 405 reflects off mirror 415 and beam splitter 420. If source elements 405, 410 contain light of different wavelengths, beam splitter 420 may advantageously be a dichroic beam splitter that transmits the wavelength of light emitted by source element 410 and reflects the wavelength of light emitted by source element 405.

Most of the light from beam splitter 420 passes through beam splitter 425. A small amount of light is reflected off beam splitter 425 and is lost. The light passes through beam expander 435, which expands the size of the beam on the way out of the tracker. Expanding the beam of light is helpful because it enables the light to propagate a longer distance with less change in beam size. The laser light 440 leaving the tracker 10 travels to a retroreflector target 26. A portion of this laser light reflects off the retroreflector 26 and returns to the tracker. The beam expander 435 reduces the size of the beam on the way back into the tracker.

Part of the returning light travels to beam splitter 425. Most of the light passes on to elements 405, 410 but a small amount is split off and strikes position detector 450. In some cases, the light may pass through a lens after reflecting off beam splitter 425 but before striking position detector 450. The position detector 450 may be of several types—for example, a position sensitive detector or photosensitive array. A position sensitive detector might be a lateral effect detector or a quadrant detector, for example. A photosensitive array might be a CMOS or CCD array, for example. Position detectors are responsive to the position of the returning light beam. The motors attached to the azimuth mechanical axes and the zenith mechanical axes are adjusted by a control system within the tracker 10 to keep the returning light beam centered, as nearly as possible, on the position detector 450.

The SMR 26 includes a body having a spherical exterior portion and a retroreflector. The spherical exterior portion contains a cavity sized to hold a cube corner retroreflector, which is at least partially disposed in the cavity. The spherical exterior portion has a spherical center. A cube corner retroreflector may be an open-air cube corner or a glass cube corner. An open-air cube corner retroreflector has an interior portion of air, while a glass cube corner retroreflector has an interior portion of glass.

A cube corner retroreflector includes three planar reflectors that are mutually perpendicular. The three planar reflectors intersect at a common vertex, which in the ideal case is a point. Each of the planar reflectors has two intersection junctions, each intersection junction of which is shared with an adjacent planar reflector for a total of three intersection junctions within the cube corner retroreflector. The cube corner retroreflector has an interior portion that is a region of space surrounded on three sides by the planar reflectors. In the case of an open-air cube corner retroreflector, which is the subject of the present application, the cavity includes an air-filled portion interior to the three planar reflectors, the three intersection junctions, and the vertex. The cavity is open to an exterior of the body, which provides a means for light to be sent into and reflected from the retroreflector.

Figure 4:
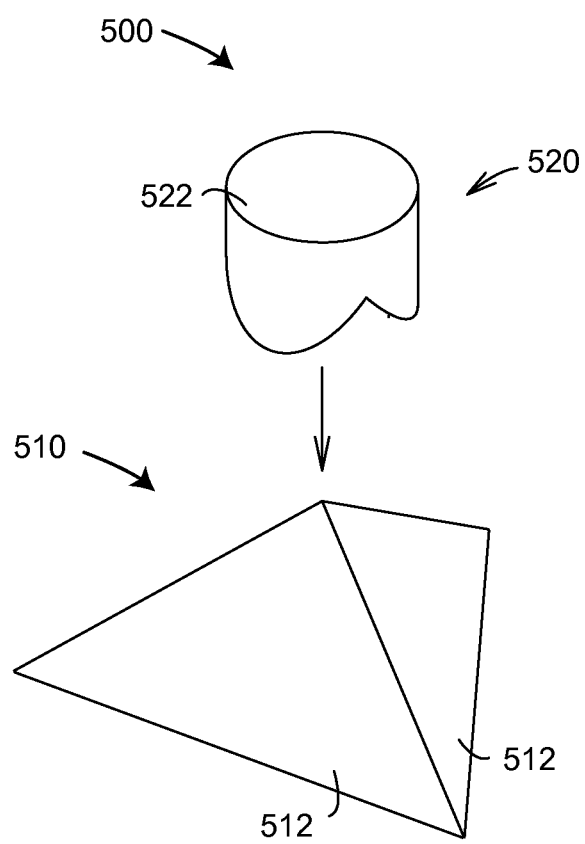
FIG. 4 is a perspective view of elements used in replicating a cube corner retroreflector.

There are at least three common methods for making open-air cube corner retroreflectors: a replication process, a mirror insertion process, and an ECM process. FIG. 4 illustrates the replication process. A master element 510 is carefully machined to produce the characteristics desired in the final replicated retroreflector. For example, the master element 510 may be machined to make each of the three planar reflector faces 512 almost exactly perpendicular to its two neighbors 512. The three planar reflector faces 512 of the master element 510 may be perpendicular to each of the neighboring reflectors to within one or two arc seconds. The master element 510 is coated with a reflective material such as gold. A cube corner slug 520 includes a machined blank 522 coated with a thin adhesive layer of material such as epoxy. The cube corner slug 520 is brought in contact with the master element 510. In doing so, the epoxy layer is brought into conformance with the shape of the master element 510. After the epoxy cures and the slug 520 is lifted off the master element 510, the gold layer sticks to the epoxy, thereby providing the cube corner slug 520 with a reflective coating.

The second common method of making open-air cube corner retroreflectors is the minor insertion process in which minor panels joined into a cube-corner assembly are inserted into a cavity in the spherical exterior portion. Three minor panels are joined together to be mutually perpendicular.

The third common method of making open-air cube corner retroreflectors is the electrochemical machining (ECM) process. In some cases, the retroreflector and the spherical exterior portion are integrated into a single unit. Such an SMR may be created, for example, by removing the cavity using a combination of traditional machining and ECM. Such an ECM process may be used to create three mutually perpendicular surfaces that are flat and smooth. Such surfaces may be covered with a reflective coating such as gold or silver to provide the three reflective surfaces.

Figures 5A, 5B, 5C:
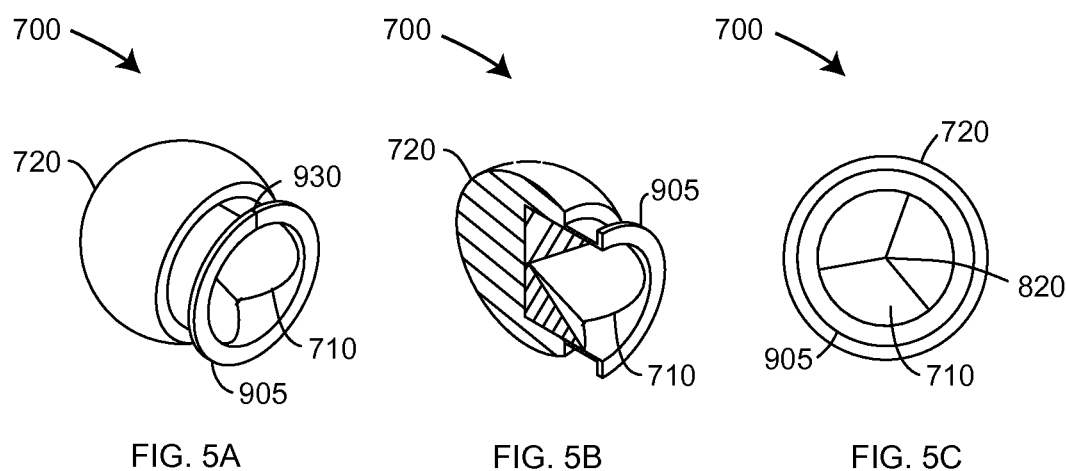
FIGS. 5A-C are perspective, cross-sectional, and front views, respectively, of an SMR that includes an open-air cube-corner slug embedded within a sphere according to embodiments.

An SMR having an open-air cube corner retroreflector is illustrated in FIGS. 5A-C. FIG. 5A shows an SMR 700, which includes a spherical exterior portion 720, an open-air cube corner retroreflector 710, a collar 905, and a reference mark, or feature, 930. In an embodiment, a cavity in the spherical exterior portion 720 is sized to accept the cube corner retroreflector 710. The cube corner retroreflector 710 is at least partially disposed in spherical exterior portion 720, possibly with adhesive. The collar 905 provides protection for the cube corner retroreflector 710 and provides a convenient grip. The reference mark, or feature, 930 may be used to establish an orientation of the SMR in space, as discussed in more detail hereinbelow. The reference feature 930 may also be a textural feature such as a dimple or bump. It might be a serial number, a reflective region (as in 610 of FIG. 6A), a barcode (as in 630 of FIG. 6B), a radio frequency identification (RFID) tag, or other feature. In this case, the reference mark may be selected by convention to be for example a center, a left side, or a right side of a given feature. The reference feature may be any feature that enables the user or a reading device to distinguish an orientation of the retroreflector 710. FIG. 5B shows a cross sectional view taken through the center of the SMR 700. The cross section reveals the open-air cube corner 710 to be of the replicated type, but a cube corner retroreflector formed of three mirror panels or directly formed using ECM could equally well be used. FIG. 5C shows a front view of the SMR 700.

FIGS. 6A-C depict three embodiments of SMRs. In FIG. 6A, the SMR 700 includes a spherical exterior portion 720, a cube corner retroreflector 710, and a collar 905. A region of reflecting material 610 is placed on the front surface of collar 905 in FIG. 6A. This region of reflecting material 610 is illuminated by light from the laser tracker and its position determined by a locator camera disposed on the tracker. For example, the light might be provided by the light sources 54 and the image of the illuminated SMR captured by one or more locator cameras 52 as shown in FIG. 1. The position of the region 610 may be used to find an orientation of the SMR 700 as explained further hereinbelow. In FIG. 6B, the SMR 700 includes the same elements as in FIG. 6A except that the region of reflecting material 610 is replaced by a barcode pattern 630. The barcode pattern 630 may be a one-dimensional barcode pattern or a two-dimensional barcode pattern. Two dimensional barcode patterns are sometimes referred to as matrix barcodes, 2D barcodes, 2D codes or by names such as QR that indicate the specific form of the code. The barcode may serve to provide an identification of the SMR or to store one or more parameters of the SMR as is described in more detail hereinbelow. The barcode 630 may also act as a reference mark (serving the function of 930 in FIG. 5A) or as a region of reflecting material to provide an orientation of the SMR 700. If desired, the barcode pattern may extend around the entire circumference of the collar lip rather than only a portion of the lip as shown in FIG. 6B. If desired, the type of barcode pattern known as a radial pattern may be used. In FIG. 6C, the SMR 700 includes the same elements as in FIG. 6A except that the region of reflecting material 610 is replaced by an RF identification chip 650. This chip may be interrogated by an RF transmitter/receiver, which might be, for example, a handheld unit or a unit located on a laser tracker 10, to obtain information about the SMR 700. This information may be a serial number or one or more parameters of the SMR 700.

Figure 7A:
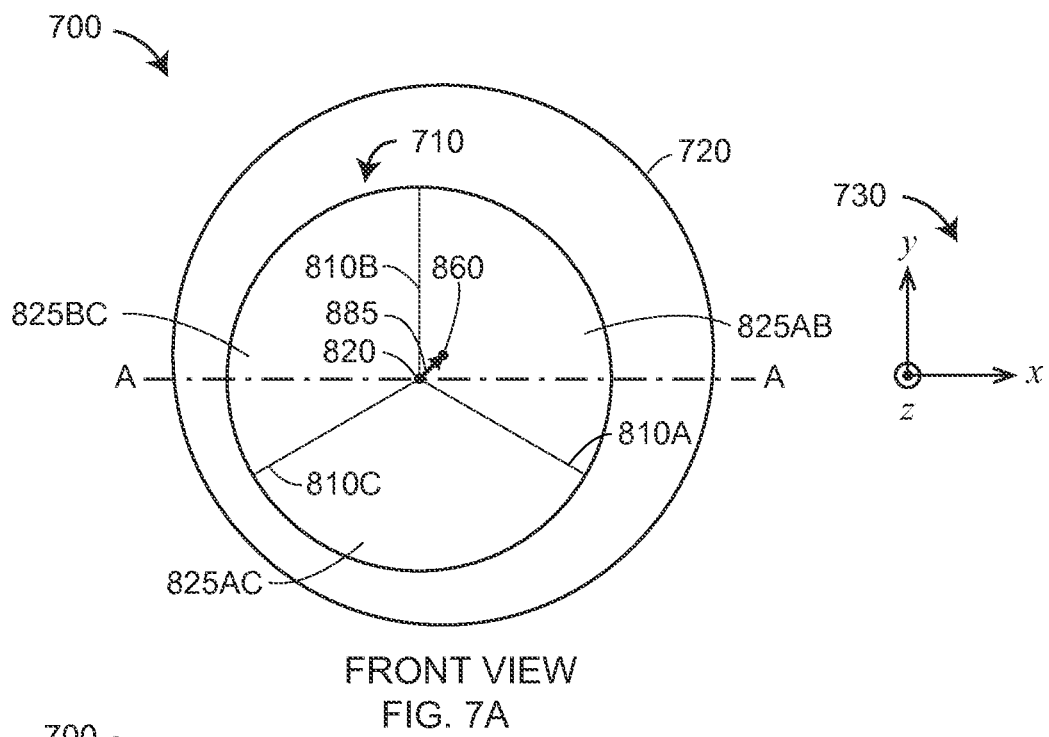
FIGS. 7A-B are front and side sectional views, respectively, of an SMR having a cube corner retroreflector not perfectly centered within a sphere.
Figure 7B:
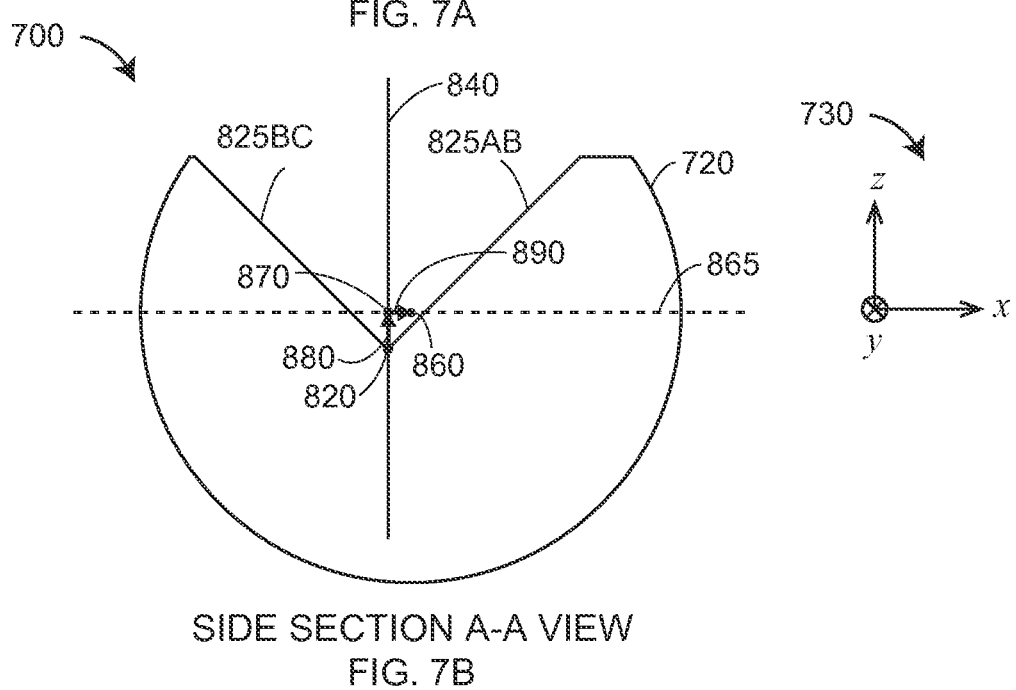

FIGS. 7A, 7B show front view and side-sectional views of an SMR 700. The SMR includes a spherical exterior portion 720 and a retroreflector 710. The retroreflector 710 is a cube corner retroreflector having three planar reflectors 825AB, 825BC, and 825AC that are mutually perpendicular and intersect in three intersection junctions 810A, 810B, and 810C and a vertex 820. In an ideal SMR the three intersection junctions are intersection lines and the vertex is a point. In this application, the term line is often used to refer to an intersection junction even if the junction is not a perfectly straight and sharp line. Similarly the term vertex is often used to represent the intersection of region point of the three planes even if the actual region of intersection is not a perfect point. The spherical exterior portion 720 has a sphere center 860, which in general is at a different point in space than the vertex 820.

An axis of symmetry 840 is symmetrical with respect to the three intersection lines 810A, 810B, and 810C. The angle between the axis of symmetry and any of the three intersection lines is $\cos^{-1}(1/\sqrt{3})=54.7°$. A runout plane 865 that passes through the sphere center 860 is drawn perpendicular to the axis of symmetry 840. The axis of symmetry 840 intersects the runout plane 865 in an intersection point 870. An SMR error vector 885, which extends from the vertex 820 to the sphere center 860, decomposes into two vector components: an SMR depth error vector component 880 that extends from vertex 820 to the intersection point 870 and an SMR runout error vector component 890 that extends from the intersection point 870 to the sphere center 860. The SMR depth error vector component 880 has a length equal to an SMR depth error, and the SMR runout error vector component 890 has a length equal to an SMR runout error. The SMR depth error vector component 880 and the SMR runout error vector component 890 are shown in FIG. 7B, which is a side view of a cross section drawn through line A-A in the front view of FIG. 7A. The SMR has an SMR frame of reference 730 that is fixed relative to the SMR. An example of a possible SMR frame of reference is shown in FIGS. 7A, 7B. All of the elements of the SMR, including the SMR error vector, the SMR depth error vector, and the SMR runout error vector, are fixed relative to the SMR frame of reference. The SMR frame of reference may conveniently be placed at either the vertex point 820 or the sphere center 860.

Figure 8B:
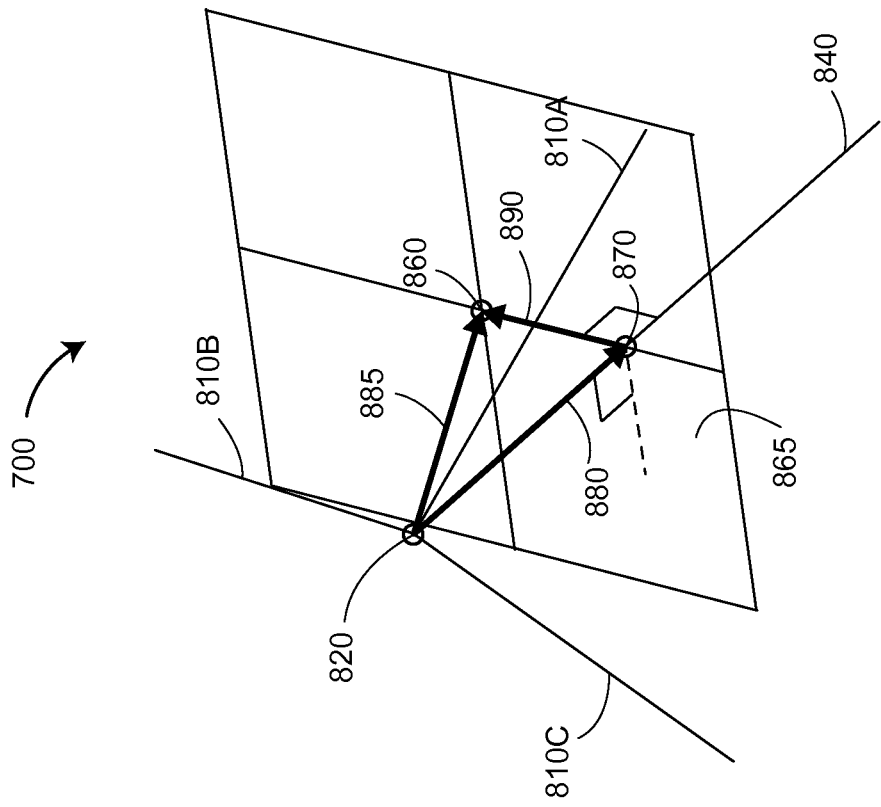
FIG. 8B is magnified view of the SMR vertex point and sphere center with error vector and error vector components according to an embodiment.
Figure 8A:
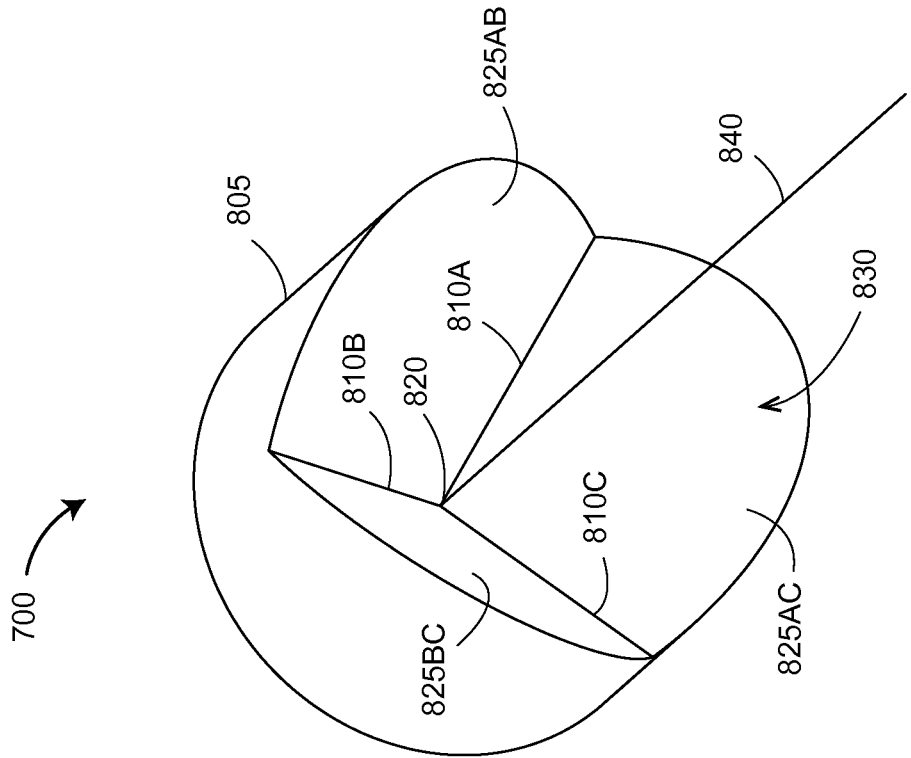
FIG. 8A is a perspective view of a portion of a cube corner retroreflector with its axis of symmetry.

The elements of FIGS. 7A, 7B are shown in FIGS. 8A, 8B in perspective view. FIG. 8A shows a portion of the SMR 700 that includes the three planar reflectors 825AB, 825BC, 825AC, the three intersection junctions 810A, 810B, 810C, the vertex 820, and the axis of symmetry 840. FIG. 8B shows a magnified view of the region near the center of the SMR, with the vertex 820 shown in line with the axis of symmetry 840. The runout plane 865 is perpendicular to the axis of symmetry 840 and passes through the sphere center 860. The axis of symmetry intersects the runout plane at an SMR intersection point 870. The SMR error vector 885 extends from the vertex 820 to the sphere center 860. The SMR depth error vector 880 extends from the vertex 820 to the SMR intersection point 870. The SMR runout error vector 890 extends from the SMR intersection point 870 to the sphere center 860.

Figure 9B:
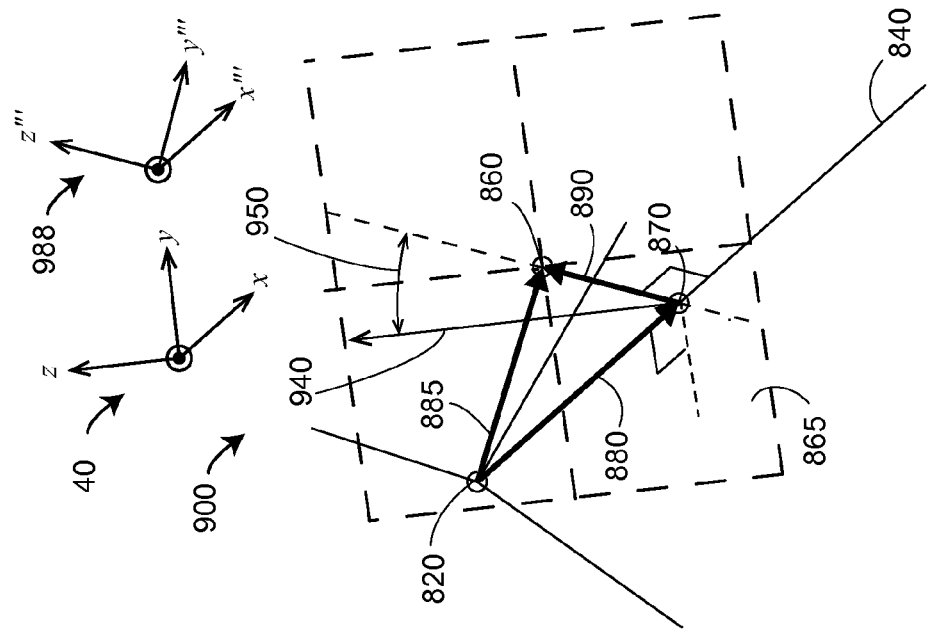
FIG. 9B is a magnified view of the SMR vertex point and sphere center showing the SMR runout reference ray and the SMR runout reference angle according to an embodiment.
Figure 9A:
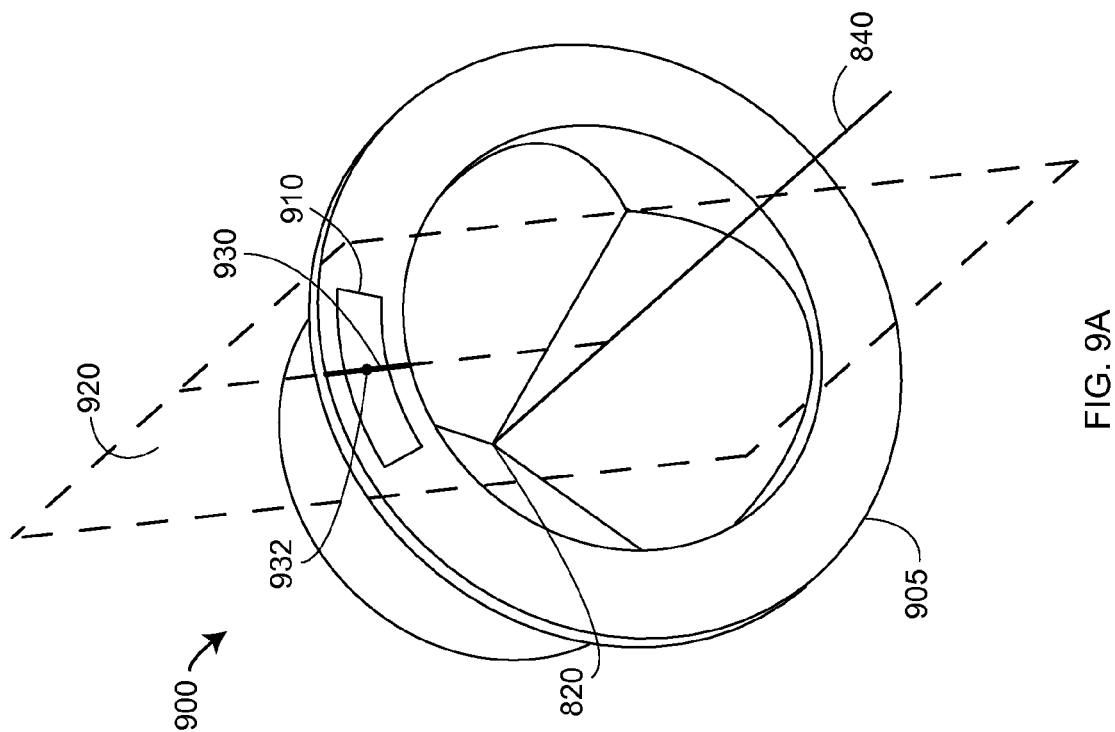
FIG. 9A is a perspective view of a portion of a cube corner retroreflector including a reference mark and an SMR runout reference plane.

FIG. 9A shows a portion 900 of an SMR that includes a collar 905 onto which is affixed a reference feature 910, which might be a serial number or barcode, for example. In this example, the reference mark 930 is selected by convention as being in the center of the reference feature 910. In another embodiment, the reference mark is a line 930 inscribed on the collar as in FIG. 5A. In another embodiment, the reference mark is affixed directly to the spherical exterior portion 720. Associated with the reference mark 930 is a reference point 932. An SMR reference plane 920 encompasses the reference point 932 and the axis of symmetry 840.

A magnified perspective view near the center of the SMR is shown in FIG. 9B. The vertex point 820 is shown in both FIGS. 9A, 9B. An SMR reference ray 940 is a ray coincident with the line of intersection between the SMR reference plane 920 and the SMR runout plane 865, wherein the SMR reference ray 940 begins at the SMR intersection point 870 and is directed along the half of the SMR reference plane 920 that includes the reference point 932. The angle between the SMR reference ray 940 and the SMR runout error vector 890 is the SMR runout reference angle 950. The numerical value of the SMR runout reference angle of a particular SMR is a property of that SMR. In an embodiment, the SMR depth error, the SMR runout error, and the SMR runout reference angle are determined for each SMR by carrying out measurements as discussed hereinbelow.

Figure 9D:
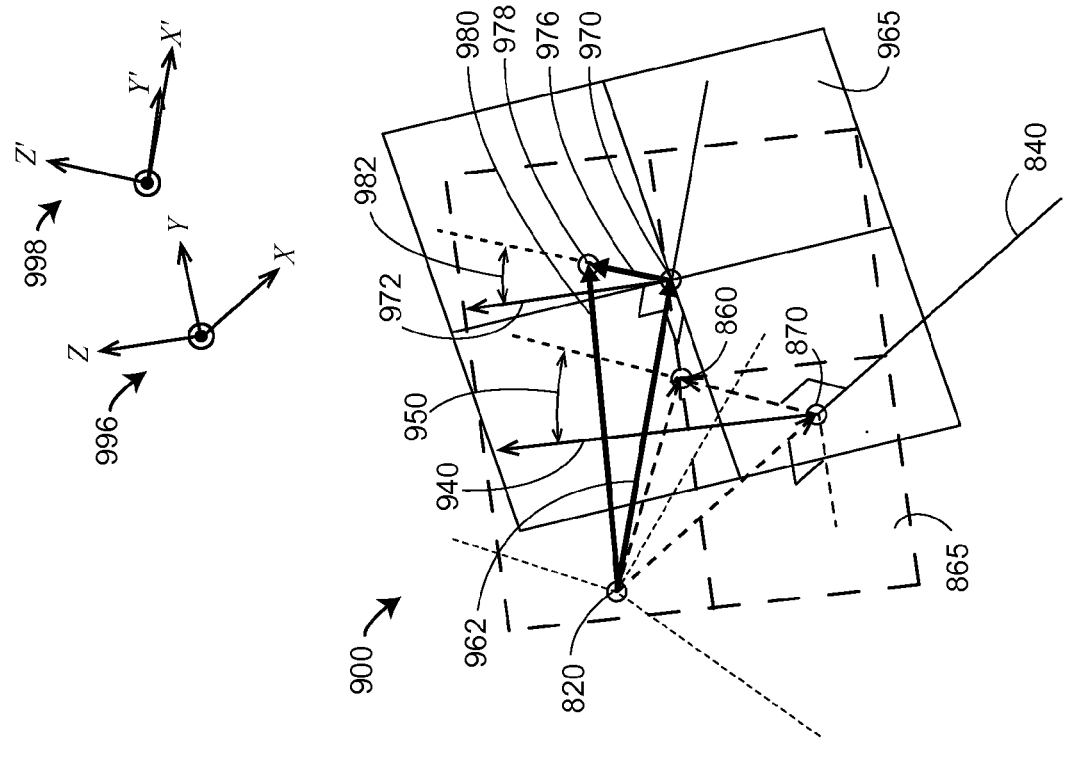
FIG. 9D is a magnified view of the SMR vertex point and sphere center showing the beam runout reference ray and the beam runout reference angle according to an embodiment.
Figure 9C:
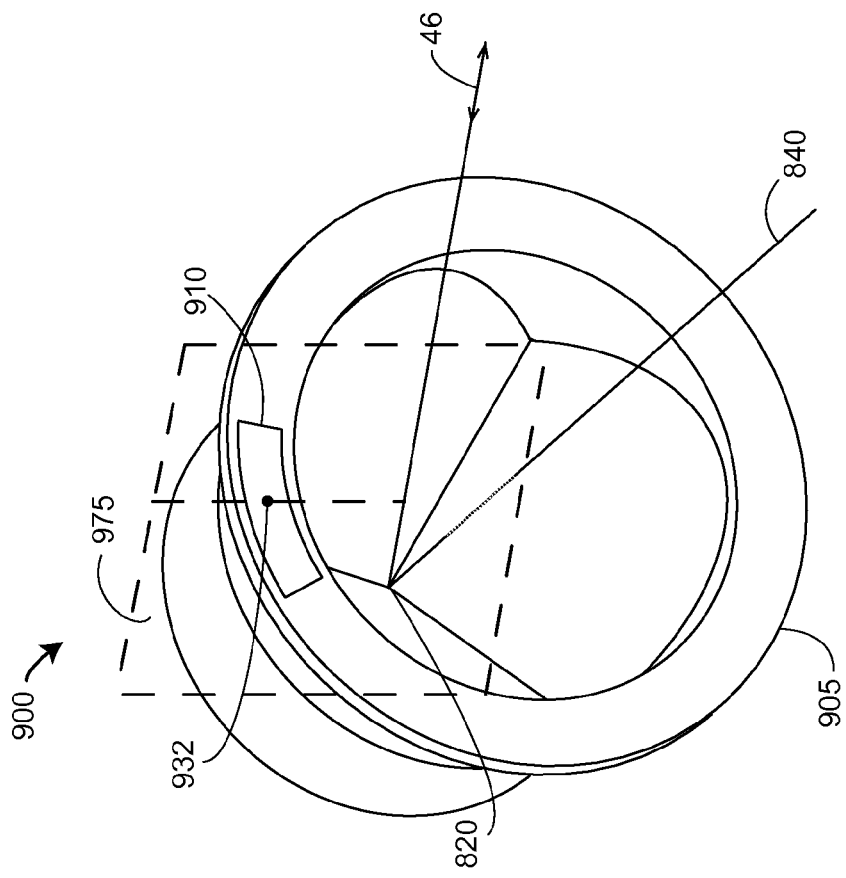
FIG. 9C is a perspective view of a portion of a cube corner retroreflector including a reference mark and a beam runout reference plane.

FIG. 9C shows the same portion 900 of an SMR as in FIG. 9A. A beam of light 46 from a device 10 intersects the vertex point 820. A beam depth error vector 962 has a magnitude equal to the SMR depth error 880 and extends along the direction of the beam 46 from the vertex point 820 to a beam intersection point 970, as shown in FIG. 9D in a magnified perspective view near the center of the SMR. A beam runout plane 965 includes the beam intersection point 970 and is perpendicular to the beam depth error vector 962. A beam reference plane 975 encompasses the reference point 932 and the beam depth error vector 962.

A beam reference ray 972 is a ray coincident with the line of intersection between the beam reference plane 975 and the beam runout plane 965, wherein the beam reference ray 972 begins at the beam intersection point 970 and is directed along the half of the beam reference plane 975 that includes the reference point 932. The angle between the beam reference ray 972 and the beam runout error vector 976 is the beam runout reference angle 982. To the extent that the beam of light 46 is not aligned with the axis of symmetry 840, there will be a difference between the calculated 3D coordinates of the sphere center 978 and the actual 3D coordinates 860 of the sphere center. This difference is discussed further with reference to FIGS. 12A-E.

Measurements are performed on each SMR to determine the position of the sphere center relative to the vertex. The results of such measurements may be described in several different ways. One such description of the sphere center relative to the vertex point includes the SMR depth error 880, the SMR runout error 890, and the SMR runout reference angle 950. A different but equivalent description includes component lengths of the SMR error vector using Cartesian coordinates. For example, such component lengths may be given along Cartesian axes x, y, z within a frame of reference of the SMR such as the frame of reference 730 of FIGS. 7A, 7B. Some alternative descriptions are now given. Other coordinate systems are also possible, as will be clear to one of ordinary skill in the art.

FIG. 9B shows the frame of reference 40, which is fixed to the SMR as shown in FIG. 1. If the vertex 820 is taken as the origin in the frame of reference 40, the 3D coordinates of the sphere center (C) are given in the frame of reference 40 as $(x_C, y_C, z_C)$, where $x_C$ is the SMR depth error and $y_C$, $z_C$ are coordinates in the SMR runout plane of an SMR runout error vector. In this case, the z axis is taken along the direction of the SMR reference ray 940. An alternative approach is to use a frame of reference 988, for which the $z'''_C$ axis is aligned to the position of maximum runout, which is to say that the $z'''_C$ axis is aligned to the SMR runout error vector 890. In this case, the 3D coordinates of the sphere center (C) are given as $(x'''_C, y'''_C, z'''_C)=(x'''_C, 0, z'''_C)$ since $y'''_C$ is zero for this case. The frame of reference 988 may be realized by aligning the reference mark 930 to the position of maximum runout of the retroreflector.

A Cartesian frame of reference may also be applied to the beam runout plane 965. FIG. 9D shows the frame of reference 996. If the vertex 820 is taken as the origin in the frame of reference 996, the 3D coordinates of the calculated sphere center 978 based on the direction of the beam (B) of light are given as $(X_B, Y_B, Z_B)$, where $X_B$ is the SMR depth error along the direction of the beam of light (the $X_B$ axis) and $Y_B, Z_B$ are coordinates in the beam runout plane of the beam runout error vector. The magnitudes of the components $Y_B, Z_B$ are the same as the magnitudes of the components $Y_C, Z_C$, only shifted from the plane 865 to the plane 965. An alternative approach is to use a frame of reference 998, for which the $Z'_B$ axis is aligned to the beam runout error vector 976. In this case, the 3D coordinates of the calculated sphere center (B) are given as $(X'_B, Y'_B, Z'_B)=(X'_B, 0, Z'_B)$ since $Y'_B$ is zero for this case.

There are many ways to find the position of the sphere center 860 relative to the vertex 820. One method is to measure the SMR with a Cartesian coordinate measuring machine (CMM). With this method, the position of the vertex relative to the sphere center can be found to a fraction of a micrometer. For example, with a very good Cartesian CMM, an expanded uncertainty of the position of the center relative to the vertex may be better than 0.4 micrometer along each of three Cartesian axes x, y, z. This error is much less than the centering error of an SMR, which, in a typical SMR is 0.0005 inch=12.7 micrometers along the axes x, y, z. In a very good SMR, the specified centering error components may be as small as 0.0001 inch=2.54 micrometers.

Another way to measure the depth of the sphere center 860 relative to the vertex 820 makes use of an absolute interferometer or other type of ADM having a high accuracy. In an embodiment, a kinematic nest configured to repeatably center a spherically shaped object is arranged to push upwards on an SMR. A reference SMR is measured with an accurate Cartesian CMM to find the SMR error vector 885. The reference SMR is placed in the nest and the absolute interferometer is used to measure the distance along a horizontal line from the absolute interferometer to the vertex of the SMR. An SMR under test is next placed in the nest and the measurement repeated. Let the SMR depth error of the reference SMR, $E_{DepthRefSMR}$, be taken as generally positive in the direction from a distance measuring device to the SMR. Then, following the above procedure, the SMR depth error of a test SMR is $$E_{DepthTestSMR}=d_{TestSMR}-d_{RefSMR}+E_{DepthRefSMR}, \quad (1)$$

where $d_{TestSMR}$, $d_{RefSMR}$ are the measured distances to the SMR under test and the reference SMR, respectively.

Another way to measure the SMR runout error and SMR runout reference angle (or, equivalently, the Cartesian errors in the SMR runout plane) is to rotate an SMR under a microscope according to a method well known in the art. A description of this method is given in Section B-2.1 of Appendix B of ASME Standard B89.4.19-2006, *Performance Evaluation of Laser-Based Spherical Coordinate Measurement Systems*, which is incorporated by reference herein. With this method, an SMR under test is placed on a kinematic nest that rests on a microscope stand. A light source illuminates the frame of the microscope. The focus is adjusted to view a speck of dust (or other small object) on the microscope frame. An operator rotates the SMR about the sphere center within the kinematic nest and observes on the microscope the radius of the runout circle. The observed radius is divided by four to get the SMR runout error, which is the magnitude of the SMR runout error vector 890. The procedure discussed in this paragraph is used as a method of determining whether an SMR meets it runout (centering) specifications. For example, a manufacturer may provide a specification for an SMR stating that the SMR has a centering error of less than 0.0005 inch. This would be interpreted to mean that the SMR has an SMR depth error of less than 0.0005 inch and SMR runout error of less than 0.0005 inch. Although the depth error and the runout error have been measured in the past for SMRs, provision has not heretofore been made to use these values by a processor to correct readings of device 10 based on SMR compensation parameters, the compensation parameters which might include SMR depth error and SRM runout error vector component information.

The observed position of the SMR runout error relative to a reference mark on the SMR may be used to determine the SMR runout reference angle 950. In an embodiment, discussed further with respect to FIGS. 19A, 19B, the reference mark 930 is aligned to the observed position of maximum runout during the test procedure. The effect of this is to make the SMR runout reference angle equal to zero. In an embodiment, a calibration laboratory technician places the reference mark 930 at the position of maximum runout. In other words, the laboratory technician places the reference point 932 within the reference plane 920.

Besides errors in SMR centering (SMR depth error and SMR runout error vector component), there are also errors in SMR radius. In other words, the SMR radius is not exactly that indicated in a manufacturer's specifications. As an example, some high quality SMRs are manufactured from grade 25 steel balls having a diameter tolerance of ±0.0001 inch=±2.54 micrometers, which is equivalent to a radius tolerance of ±1.27 micrometers. In other words, for an SMR manufactured with this type of steel ball, the actual SMR radius is expected to lie within ±1.27 micrometers of the nominal (specified) radius, at least at portions of the spherical surface not too close to the cavity that holds the retroreflector.

There are several ways to measure the radius of an SMR. A Cartesian CMM can be used to accurately measure the radius of an SMR under test. The radius error is found by taking the difference between the measured radius and a reference or nominal radius.

An absolute interferometer may also be used to measure the radius error of an SMR under test. With this method, a reference sphere (ball) is measured with a coordinate measuring instrument such as a Cartesian CMM or Talyrond® roundness measuring device to find the radius of the reference sphere. In an embodiment, a kinematic nest configured to repeatably center a spherically shaped object is arranged to push upwards on a spherical surface. The reference sphere is placed in the nest and the absolute interferometer focused onto the sphere surface along a line normal to the surface. The absolute interferometer measures a distance from the interferometer to the surface. An SMR under test is next placed in the nest. The SMR is rotated to enable the beam from the absolute interferometer to be collinear with a normal vector to the spherical exterior portion 720, and the absolute interferometer is used to measure the distance. The difference between the measured distance to the SMR under test and the measured distance to the test sphere is the radius error.

Changes in temperature of the SMR may cause the vertex 820 to shift its position relative to the sphere center 860. Such changes in SMR temperature may result from (1) changes in the ambient temperature of the air surrounding the SMR, (2) heating of the SMR by the operator's hand, and (3) contact of the SMR with a relatively warm object such as a home position nest 17 of a laser tracker 10 of FIG. 1.

With some types of SMRs, the effect of temperature may be relatively small. For example, as discussed hereinabove, one type of SMR is made of a single piece of steel into which the three mutually perpendicular surfaces are etched using ECM. With this type of SMR, the change in the SMR depth error with temperature will equal the coefficient of thermal expansion (CTE) times the change in SMR temperature times the initial SMR depth error. If the initial SMR depth error is 0.001 inch=25.4 micrometers and the SMR is made of steel having a coefficient of thermal expansion of 11.5 micrometers/meter/° C., the change in the SMR depth error over a 30 degree Celsius change in SMR temperature is $(25.4 \times 10^{-6})(11.5)(30)$ micrometer=0.009 micrometer, which is a negligible amount.

With some other types of SMRs, the thermal effects are larger. For example, consider the type of SMR that includes an aluminum slug put into a 1.5 inch (38.1 mm) diameter spherical exterior portion of steel. Suppose that the aluminum slug extends 10 mm below the vertex and is glued to the steel portion at that position. Neglecting the thermal expansion of the glue bond and considering a point of contact at which the axis of symmetry intersects the spherical exterior portion, the relative change in the vertex position with temperature is the difference in the CTE values for aluminum and steel times the 10 mm extension times the change in temperature. Suppose that the CTE of steel is 11.5 micrometers/meter/° C., the CTE of aluminum is 23 micrometers/meter/° C., the depth extension is 10 mm, and the change in temperature is 30° C. The change in the vertex relative to the sphere center is then $(0.01)(23-11.5)(30)$ micrometers=4.45 micrometers.

To correct for the movement of the SMR vertex as a result of thermal expansion, a temperature sensor such as a thermistor or RTD may be embedded in the SMR. In an embodiment shown in FIGS. 10A, 10B, 10C, a small connector socket 1030 is disposed on or in the SMR 1000. The connector socket is attached through a collection of wires 1032 (typically two or three wires) to the temperature sensor 1034. The temperature sensor 1034 might be a thermistor, RTD, thermocouple, or other device. A sensor cable 1040 includes a second collection of wires 1044 attached to a first connector 1042 on one end of the cable 1040 and to a second connector 1046 on the opposite end of the cable. The first connector 1042 attaches to the connector socket 1030 and the second connector 1046 attaches to a temperature measurement system disposed on a laser tracker 10, computer 80, accessory box 70, temperature meter, or other device. Many types of temperature measurement systems may be used. A simple temperature measurement system (not shown) may include electronics based on a Wheatstone bridge having three internal resistors. A first internal resistor may be attached to a voltage source, a second internal resistor attached to a ground, and the external temperature sensor 1034 and wires in cable 1044 providing a fourth external resistive leg of the bridge. Such temperature measurement systems are well known in the art. The temperature measurement system converts observed voltages into a temperature of the SMR. Coefficients stored in memory may then be used to correct the position of the vertex relative to the sphere center. The memory may be included in a laser tracker 10, computer 80, accessory box 70, or other device. Measurements are carried out ahead of time for a particular type of SMR to obtain information that describes SMR thermal expansion characteristics. In a simple case, a single CTE value or CTE value times SMR depth error may be sufficient to describe the vertex movement relative to the sphere center. For example, in the example given above in which the vertex moves by 4.45 micrometers over 30 degrees Celsius, the single parameter might be used to give a value of 0.1483 for CTE times depth error, the value having units of micrometers per degree Celsius. In another embodiment, a table of values or coefficients is provided.

Use of an embedded temperature sensor 1034 with a sensor cable 1040 has the advantage of avoiding the need for a battery, temperature circuit, or wireless communications system within the SMR. With this system an SMR might be checked, for example, when the SMR is returned to a tracker home position.

Figure 10F:
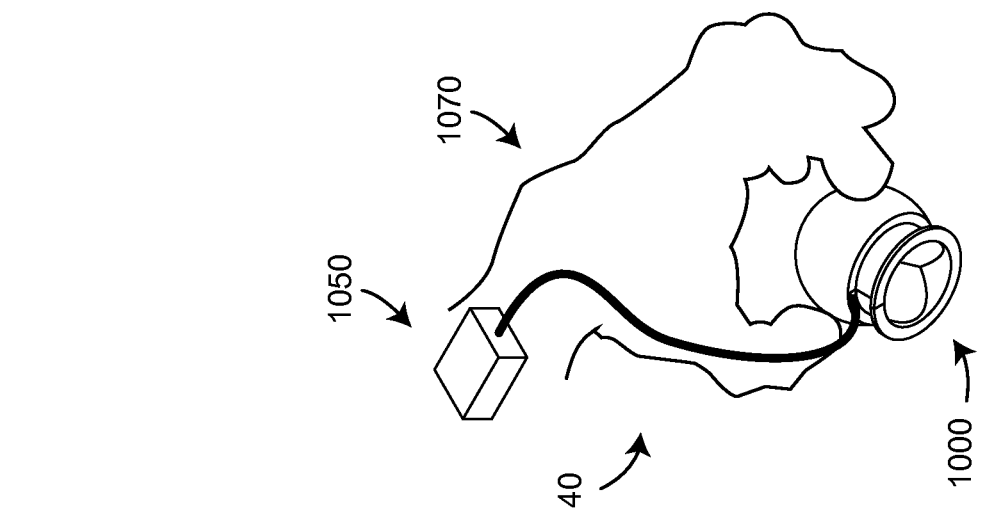
FIG. 10F is a pictorial representation of a hand holding an SMR, wherein a temperature measurement and communication unit is attached to the hand.
Figure 10E:
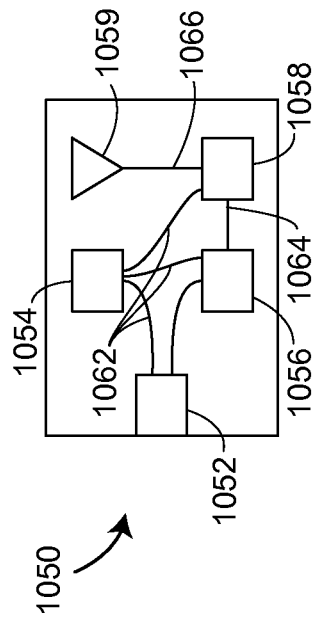
FIG. 10E is a schematic view of electrical components within the temperature measurement and communication unit.
Figure 10D:
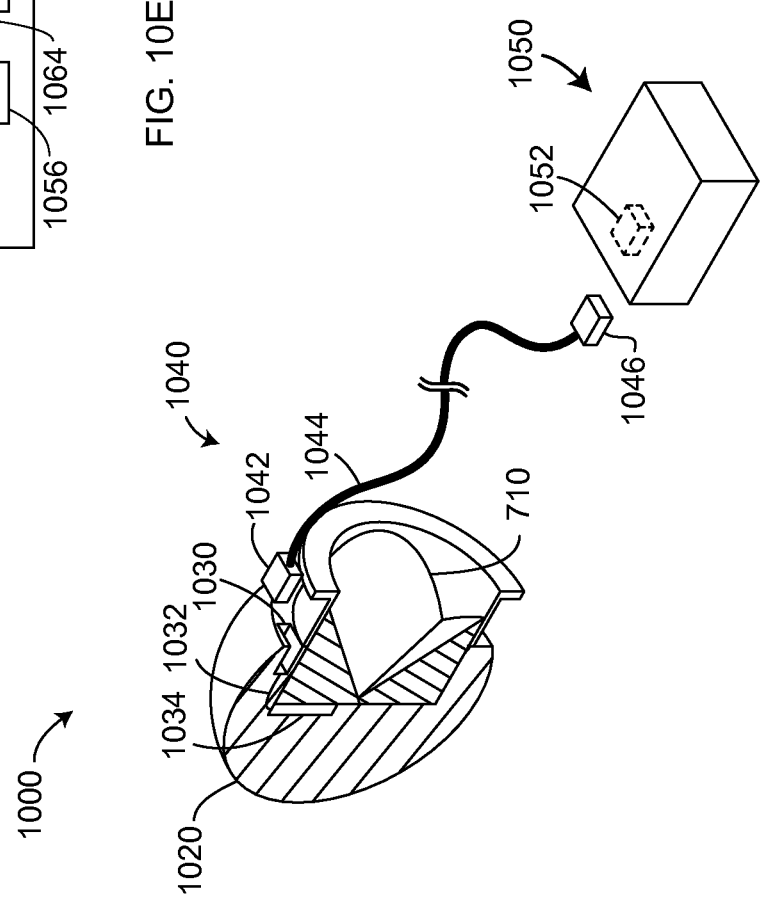
FIG. 10D shows the elements of FIG. 10C with the addition of self-contained temperature measurement and communication unit.

As shown in FIG. 10D, one possibility is to attach the cable 1040 through socket 1052 to temperature electronics module 1050. In an embodiment illustrated in FIG. 10E, a battery 1054 provides electrical power over wires 1062 to the embedded temperature sensor 1034, temperature processing electronics 1056, and wireless communications electronics 1058. In an embodiment, the temperature processing electronics 1056 includes a Wheatstone bridge, resistors, and a microprocessor to provide a digital signal through wire 1064 to wireless communications electronics 1058. The digital signal represents a temperature measured by the temperature sensor 1034. In an embodiment, the wireless communications electronics 1058 launches a digital representation of the measured temperature over antenna 1059. In an embodiment, the wireless communications electronics is configured to send the digital representation over antenna 1059 at regular intervals, for example, every five minutes. The interval time may be selected to provide adequate temperature information while saving battery power. The wireless signal from the antenna 1059 may be received by electronics within a device 10 shown in FIG. 1 and the received temperature values used to improve compensation of the 3D coordinates of the SMR sphere center. In an embodiment, the temperature electronics module 1050 may be placed in a pocket of the operator—for example, a shirt pocket or trousers pocket.

In an embodiment shown in FIG. 10F, the temperature processing electronics 1050 may be affixed to the wrist of an operator. In an embodiment, the operator wears a glove 1070 into which the temperature processing electronics 1050 and the cable 1040 are integrated. In an embodiment, the glove is an insulating glove to minimize the transfer of heat from the operator's hand to the SMR 1000. In another embodiment, the glove is not an insulating glove but has finger openings to permit direct handling of the SMR by the operator. In another embodiment, the operator does not wear a glove. Instead temperature processing electronics 1050 is attached directly to the operator's wrist, for example, by means of a strap or elastic band.

Figure 11:
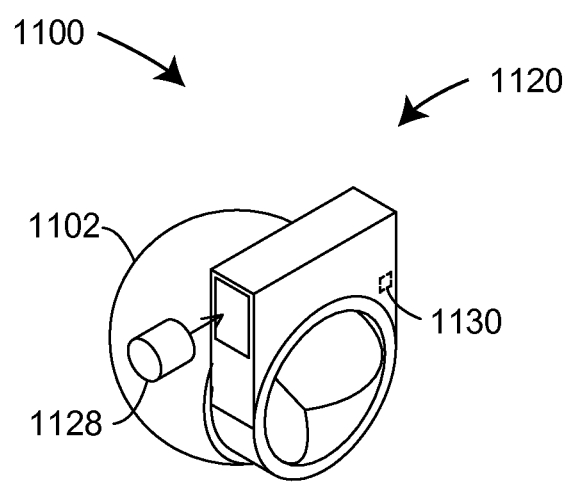
FIG. 11 is an SMR to which is attached an interface unit that includes a battery and antenna for use with a temperature sensor.

FIG. 11 shows an interface component 1120 attached to an SMR 1100. Interface component 1120 may contain a number of optional elements. The interface component 1120 may be connected to a temperature sensor mounted within the SMR 1100. Antenna 1130 may be used to send and/or to receive wireless data in the form of radio frequency signals. Such an antenna may be attached to a small circuit board powered by a small battery 1128 that fits inside interface component 1120. The small circuit board may be made of rigid-flex material which permits a very compact circuit to be enclosed within the interface component. By providing a temperature sensor and wireless communication system powered by a battery, the temperature of the SMR may be known at all times so that the measurements of the 3D coordinates of the SMR 1100 are as accurate as possible.

Numerical values used to compensate for imperfections in SMRs as a way of enabling more accurate 3D measurements are referred to as SMR compensation parameters. SMR compensation parameters are typically stored in memory of a measurement device or a computing device. For example, SMR compensation parameters may be stored in a memory of the laser tracker 10 of FIG. 1. A processor within the laser tracker 10 may be used to correct the 3D coordinates of the sphere center of SMR 26. Alternatively, a processor within an external computer 80, an accessory device, or a networked computing device may be used to access compensation values stored in memory and use these values to correct the 3D coordinates of the sphere center. Such compensations may account for differences in the position of the vertex relative to the sphere center. Such compensations may also account for the effect of errors in the sphere radius using methods described hereinbelow with respect to FIGS. 14-17.

In some cases, compensation calculations are made within a processor of a measurement device such as a laser tracker. For example, the tracker processor may identify the SMR being used for a particular measurement and automatically perform compensation calculations for that SMR to transform the measured vertex 3D coordinates to sphere center 3D coordinates. In other cases, compensations are made by application software. For example, application software may consider the position and orientation of the SMR in making a plurality of measurements and apply compensation calculations for the SMR radius to eliminate errors. In general, the term processor may be understood to mean a processor in a device such as a tracker, a processor in an external computer, or a processor in both.

There are several ways by which SMR compensation parameters can be entered into memory. In an embodiment, SMRs shipped with the device 10 from the factory come with compensation parameters pre-loaded into memory. In another embodiment, the user is provided with a list of numerical compensation values for each SMR. Application software embedded within the device 10 provides a means by which the user may enter the numerical values. Such values need only be entered once, as they are stored in memory within the device 10. In another embodiment, the SMR compensation parameters are provided on a flash drive, CD ROM, or other medium read by device 10, computer 80, or other component for automatic storage in memory. In another embodiment, numerical values for compensation parameters are downloaded into the tracker over a network. In another embodiment, SMR compensation parameters are encoded into a one-dimensional or two-dimensional barcode 630. A barcode reader may read the SMR compensation values on the barcode and automatically download these into memory in the device 10.

In an embodiment, a close-range camera 56 shown in FIG. 1 is pointed directly at an SMR when the device 10 locks onto (begins tracking) an SMR in one of the home nests 17. In the device 10 of FIG. 1, the camera 56 is placed above the aperture through which the light beam 46 is emitted. To ensure that the camera can clearly read an SMR barcode, the camera assembly may be pointed toward the center of an SMR placed in a home position 17. In other words, for the case shown in FIG. 1, the optical axis of the camera may be pointed slightly downward rather parallel to the beam of light 46. In addition, in an embodiment, the camera 46 is configured to focus clearly on an SMR in a home nest 17. This is generally different than for the cameras 52, which are ordinarily designed to focus on retroreflectors relatively far from the tracker. In an embodiment, the camera 56 has a small enough field of view to provide adequate resolution for a bar code or serial number. For example, the field of view for such a camera might be about 20 degrees. The small field of view and clear focus at the home position may be obtained by correctly selecting the focal length and adjusting the position of the lens in the camera 56. The combination of optimum pointing direction (toward the home positions 17), in-focus condition at the home position 17, and relatively small field of view ensure that a relatively inexpensive camera 56 can clearly resolve the marks on a barcode 610, which might be a one-dimensional or two-dimensional barcode, for example. Furthermore any lights near the SMR are turned off during the operation of the camera 56 to ensure that the camera photosensitive array is not blinded by a bright retroreflected light. Ordinarily any lights need to be located at least one retroreflector diameter away from the edge of the retroreflector to prevent this blinding effect. In other words, if the retroreflector is an open air cube corner retroreflector having a circular cross section and a diameter of one inch, any lights should be located at least one inch from an outer edge of the retroreflector. Because the laser beam 46 leaving the tracker is collimated and strikes the retroreflector in the center, in most cases, little light will scatter back into the camera 56. However, if the laser beam 46 is too bright, it can be turned off during the reading of the barcode on the SMR. In an embodiment, the camera 56 is used in combination with optical character recognition (OCR) software to read a serial number.

Inasmuch as the resetting of SMR distance at the home position is routine, a measurement of the barcode on the SMR can be made in conjunction with the home position measurement without requiring extra steps on the part of the operator. In an exemplary method, the SMR is placed in the home position. The tracker first turns on the camera to view the barcode and extract the SMR parameters. It then turns on the beam of light, sends it to the vertex, measures the distance, and resets the distance to a home reference value. To reset the distance meter to the home reference value in the most accurate possible way, in an embodiment, software within the tracker sets the distance value to be applied at the SMR sphere center rather than the vertex point. This is important because it ensures that the home reference value is correctly applied for all SMRs, regardless of the SMR depth error. To determine the sphere center as accurately as possible, the SMR should be placed in a preferred orientation within the home position nest 17 or the camera 56 should be used to automatically determine the orientation of the SMR in the home position nest. These methods of establishing the position of the SMR in the home position nest are discussed in more detail hereinbelow. In FIG. 17, there are three different home position nests sized to accommodate three differently sized SMRs. In an embodiment, the SMRs are sized to accept SMRs having diameters of 1.5, 0.875, and 0.5 inch. A different home reference value is provided for each of these home position nests.

In an embodiment, SMR compensation parameters are encoded into an RFID tag 650. The encoded information is retrieved using an RFID reader, which may be attached to the payload 12, perhaps in place of the close-range camera 56. The retrieved serial number may be used to access the SMR data from a networked system (the Cloud) or from a database of information saved within a device such as a tracker or computer.

In the general case, a 3D coordinate measurement device such as laser tracker 10 obtains measured 3D coordinates of the SMR vertex, for example, by measuring a distance and two angles to the SMR. The SMR compensation factors are applied to the measured 3D coordinates of the vertex to obtain the 3D coordinates of the sphere center using methods now described. In making a measurement, the operator holds the reference point 932 so as to place the SMR reference plane 920 in a preferred orientation. A preferred orientation may be selected in several different ways, depending on the measurement objectives.

In general, the operator will endeavor to align the axis of symmetry to the direction of the beam of light from the device. This was discussed hereinabove in reference to FIGS. 12, 13. The term preferred orientation as used herein refers to a positioning of the reference point as an additional step in the alignment procedure. A way to achieve the preferred orientation while leaving the axis of symmetry aligned with the beam of light is to rotate the SMR about the axis of symmetry following the aligning of the axis of symmetry to the beam of light. Since the SMR reference ray is perpendicular to the beam of light and is in the reference plane that includes the reference point, we may say that by turning the axis of symmetry, the operator adjusts the SMR reference ray to obtain the preferred orientation.

There are some special cases in which it is not possible to align the axis of symmetry to the beam of light. For example, with the SMR at the home position 17, it may not be possible to align the axis of symmetry to the beam of light because of mechanical constraints. In this special case, the meaning of the term preferred orientation is modified accordingly to permit for the necessary change in alignment. The special case for alignment at the home position is discussed hereinbelow.

A first type of preferred orientation is one in which the SMR reference plane 920 is aligned to the x"-z" plane of the payload frame of reference 35 as shown in FIG. 1. The x" axis corresponds to the direction of the beam of light, and the z" axis is perpendicular to the x" axis and to the y" (zenith) axis. The x"-z" plane always includes the z' vector (of the device frame of reference 30), which points out the top of the device 10. For the device 10 in its normal upright position, the preferred orientation is one in which the SMR reference plane contains a gravity vector as well as the beam of light 46. However, the more general x"-z" plane can be used when the gravity vector may not be appropriate, for example, when the tracker is turned on its side with the laser beam pointed straight up. With the first type of preferred orientation, the operator simply holds the SMR so as to place the SMR sphere center and the SMR reference mark in the plane that includes the beam 46 and the axis z'. The operator should also attempt to align the axis of symmetry 840 of the SMR to the direction of the beam of light 46, as discussed hereinabove with respect to FIGS. 9C, 9C and hereinbelow with respect to FIGS. 12, 13. With the SMR held in the preferred orientation, software in the processor uses the measured 3D coordinates of the SMR vertex and the SMR compensation parameters to calculate the SMR sphere center, as described hereinabove with respect to FIGS. 9A-D.

A second type of preferred orientation is one in which the SMR reference plane 920 is aligned to the y"-z" plane of the payload frame of reference 35 as shown in FIG. 1. The y"-z" plane always includes the zenith axis 18 (y" axis) of the device 10. If the device 10 is placed in an upright orientation as shown in FIG. 1, the azimuth axis 20 is pointed in the vertical direction, and the zenith axis 18, which rotates about the azimuth axis, lies on a horizontal plane. With the second type of preferred orientation, the operator holds the SMR so as to place the SMR sphere center and the SMR reference mark in a plane that includes the beam 46 and the zenith axis 18 (x" axis). If the reference mark 930 points radially outward on a collar 905 as shown in FIG. 9A, then, for the second preferred orientation, the reference mark should be held in a horizontal plane. For the second type of preferred orientation, a preferred position of the SMR reference mark 930 relative to the sphere center 860 needs also to be given—for example, to the right of the sphere center. As stated hereinabove, the operator should attempt to align the axis of symmetry 840 of the SMR to the direction of the beam of light 46.

A third type of preferred orientation is one in which the SMR reference ray 940 is aligned in a prescribed manner to a measurement line to measure a dimensional characteristic of the measurement line. This is discussed further hereinbelow with reference to FIGS. 19A, 19B.

We now discuss with regard to FIGS. 12A-E errors associated with misalignment of the axis of symmetry 840 with respect to a beam of light from a device 10. An SMR in FIG. 12A receives a beam of light 1210 having a beam center 1212 and a beam width 1214, the beam of light 1210 beginning to be clipped by a collar 905 of the SMR. The angle 1215 is the acceptance angle of the SMR for the beam of light 1210. For an SMR that has a diameter of 1.5 inches and receives a typical beam of red light from a laser tracker 10, the acceptance angle 1215 is usually about 25 degrees.

An SMR in FIG. 12B receives a beam of light 1240 that is in line with the axis of symmetry 840. For FIG. 12B, an expanded region 1230 near the vertex 820 and sphere center 860 is shown in a magnified view 1 in FIG. 12C. Because the beam of light 1240 is aligned with the axis of symmetry 840, the position of the sphere center may be determined with accuracy only limited by the measurement error in finding the 3D coordinates of the SMR vertex—in other words, by the errors in the distance and two angles measured by the device 10.

The SMR 720 in FIG. 12D has been rotated about its sphere center by an angle of 10 degrees. As a result of this rotation, the vertex 820 shifts by an amount 1250 to a new vertex position 820R. The axis of symmetry, which is the axis that is symmetrical with respect to the three intersection junctions, also shifts by 10 degrees from the line 840 to the line 840R. As a result, rotating the SMR 720 about its center, for example, when the SMR is placed on a kinematic nest, results in a misalignment error vector 1250 in the position of the center after compensation parameters have been applied for the SMR depth error vector and the SMR runout error vector. As shown in FIG. 12E, the misalignment error 1250 includes a component 1252 along the axis of symmetry 840R and a component 1254 on a plane perpendicular to the axis of symmetry 840R.

During normal operation, an operator can usually keep the axis of symmetry 840 of a 1.5-inch diameter SMR aligned to the direction of the beam of light 1240 to within about 10 degrees. As shown in FIG. 12D, a rotation of an SMR about a sphere center 860 by an angle of 10 degrees results in a misalignment error vector 1250 that is relatively small compared to the SMR error vector 885R. For the case of the 3D coordinates of the SMR being measured by a laser tracker, the beam of light 1240 is the beam 46 as shown in FIG. 1.

Referring now to FIGS. 13A-F, methods are described to improve the alignment of the axis of symmetry 840 with the beam of light 46, thereby minimizing the magnitude of the misalignment error vector 1250. In a first method shown in FIG. 13A, an alignment cap 1310 is placed over the collar 905. The alignment cap includes a ring 1312 onto which is attached an opaque cover 1314 on which is centered marked crosshairs 1317 or a marked circle 1316 having a diameter approximately the same as the light beam 46 from the 3D coordinate measurement device 10. To align the axis of symmetry 840 with the incoming beam of light 46, the operator first blocks the beam of light with the alignment cap 1310, which stops the beam from tracking the SMR 700. The operator places the alignment cap 1310 over the collar 905 and rotates the SMR to center the incident light beam 1318 in the marked circle 1316. The operator removes the alignment cap 1310, which causes the beam to lock onto the SMR. In so doing, the light beam 46 is brought into coincidence with the axis of symmetry 840. With this method, an alignment accuracy of 2 degrees or better might be expected for a 1.5-inch SMR.

In a second method shown in FIG. 13B, a window 1320 that lets light through to the retroreflector is positioned against the collar 905 so as to align outer marked circle 1324 with the outer edge of the collar. The operator notes the position of incident light 1328 scattered off the window 1320 relative to crosshairs 1317 or an inner marked circle 1326 and rotates the SMR to bring the incident light 1328 into coincidence with the inner marked circle 1326. In so doing, the incident light beam 46 is brought into coincidence with the axis of symmetry 830.

FIG. 13C illustrates a method of aligning the SMR by observing a portion 1332 of the incident light beam with a reflective strip 1320, which might be a strip of cardboard, for example. By moving the strip in relation to the aperture of the SMR, the operator can visually judge the direction in which the SMR should be rotated to improve alignment.

FIG. 13D is like FIG. 13C except that a finger 1340 rather than reflective strip 1330 is used to observe a portion 1342 of the incident light. By moving the finger in relation to the aperture of the SMR, the operator can visually judge the direction in which the SMR should be rotated to improve alignment.

In a method shown in FIG. 13E, a reflective cap 1350 is placed over the collar 905, which is hidden from view in FIG. 13E. The reflective cap includes a ring 1352 onto which is attached a mirror 1354 designed to receive light 1352 and reflect light 1353 off the mirror's front surface. Optionally, crosshairs 1317 or a marked circle 1356 is centered on the minor 1354. The circle has a diameter approximately equal to that of the light beam from the 3D coordinate measurement device. To align the axis of symmetry 840 with the incoming beam of light 1352, the operator first blocks the beam of light with the reflective cap 1350, which stops the beam from tracking the SMR 700. The operator places the reflective cap over the collar 905 and, if the circle 1356 is present, rotates the SMR to place the beam approximately in the center of the circle. The operator observes the position of the reflected light on or near the 3D coordinate measurement device and, if needed to further improve alignment, rotates the SMR 700 to move the reflected beam of light closer to the emission point from the 3D coordinate measurement machine. In FIG. 1, the emission point of the laser tracker 10 is the point at which the beam of light 46 leaves the laser tracker 10. When the reflected beam of light is close enough to the emission point, the operator removes the mirror cap 1350, which causes the beam to lock onto the SMR. A typical high quality minor has a wedge angle of only a few arc minutes, which produces a negligible angular deviation in the reflected beam of light. By reflecting the beam of light so that it strikes the 3D measurement device near the emission point, it is possible to align the axis of symmetry 830 with the beam of light to within a small fraction of a degree. For example, an SMR 700 with reflective cap 1350 is 10 meters from a laser tracker 26, the axis of alignment 840 is aligned to the emitted light beam 46 to within 1 degree if the reflected laser beam is within about 175 mm, or about 7 inches, of the emission point.

FIG. 13F illustrates a method of causing the 3D coordinate measurement device, such as laser tracker 10, to emit a beam of light in a rotating pattern 1360 having a diameter equal to that of the SMR, for example, SMR collar 905 or similar feature. The operator aligns the SMR by rotating it until the SMR is aligned to the rotating beam.

Figure 22:
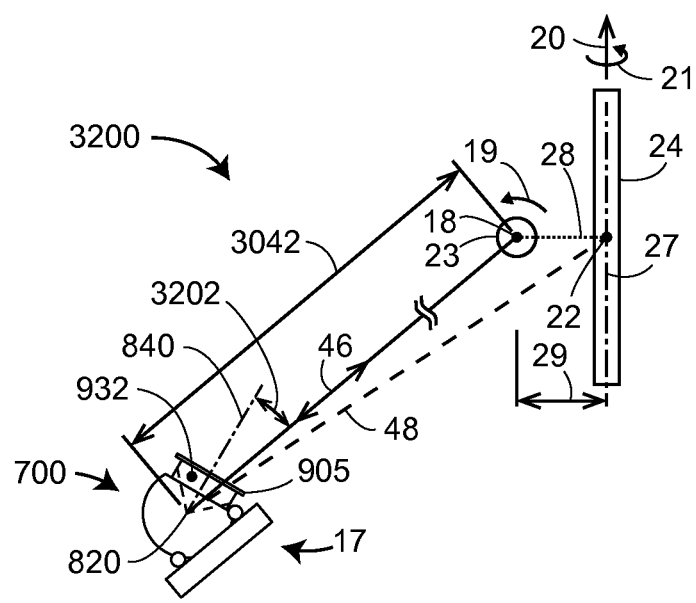
FIG. 22 shows a method for setting a distance to the vertex of an SMR in a home position.

Previously in reference to FIGS. 1 and 6, a method was taught for combining a home position measurement with a reading of barcodes using a device camera. A part of this method was setting the distance meter to a home reference value for the sphere center rather than the vertex of the SMR being used. To convert 3D coordinates from a vertex point to a sphere center, it may be important to know the orientation of the SMR in the home position, as described hereinbelow with reference to FIG. 22. Two methods are now given for establishing the orientation of the SMR.

As explained hereinabove, establishing a preferred orientation has two aspects. In the usual case, the axis of symmetry of the SMR is aligned as well as possible to the beam of light. In a second aspect, the SMR is rotated about the axis of symmetry to place the reference mark in a preferred orientation.

In some cases, it is not possible to completely align the axis of symmetry to the beam of light. For example, at a home position 17 and at some kinds of nests, mechanical constraints may prevent the SMR from being rotated into exact alignment with the beam. In the case of the home position, another type of alignment criterion may be given. For example, a manufacturer may specify that the collar of an SMR is to be placed approximately 2 mm above the nest. The software in the device 10 may then calculate the error vector based on the provided SMR parameters.

For the case in which the axis of symmetry is not aligned with the beam of light, the orientation is easily obtained by moving the reference point into the desired orientation (for example, into a vertical plane or a plane that includes the azimuth axis) and then aligning the axis of symmetry in relation to the beam direction as specified (e.g., by moving a collar 2 mm above a nest). Another possibility is to use the camera 56 to determine the orientation of the SMR. With the camera turned to point at the home position, the orientation of the SMR is easily found from the position of the barcode (or any other marker). Use of the camera in this way provides accurate results and is simple for an operator.

This camera concept may also be applied for the case of SMRs located at distances of many meters from the device 10 if suitable zoom cameras are provided in the camera. An example of such a zoom camera is described in the '758 patent, discussed above and incorporated by reference. A reflective mark such as the mark 610 of FIG. 6A of the present application may be used with such a camera to provide automatic determination of the orientation of an SMR. This method is applicable when a six DOF tracker is used with a three DOF SMR.

An SMR may be used to measure the coordinates of surface points by bringing the SMR into contact with the surface at a plurality of points. It may also be used to measure the coordinates associated with kinematic nests. In both of these types of measurements, an error in the radius of the SMR can produce an error in the measurements of surface or nest points. As explained hereinabove, methods are available to accurately measure the radius of an SMR. The radius delta, defined as the measured radius minus the nominal radius, may be stored in memory for later access. The measured radius in this case is measured by one of the accurate methods described hereinabove, for example, by using a Cartesian CMM, Talyrond®, or absolute interferometer. The radius delta may also be saved in an information storage device such as a barcode or RFID chip, which in an embodiment is attached to each SMR, and read by a reading device of the 3D coordinate measurement device.

For a device 10 used to measure 3D coordinates on a surface with an SMR, the SMR is moved to several locations on the surface, and a collection of 3D coordinates for the sphere centers of the SMR obtained for the corresponding surface contact points. 3D center coordinates in close proximity to one another are used to obtain a vector normal to the collection of 3D points. The normal vector is projected from one point in the collection of contact points or from one point not in the collection but near the collection of points. The 3D coordinates of the contact point corresponding to the one point are obtained by projecting the normal vector from the 3D sphere center coordinates toward the surface being measured.

An error in the radius of the SMR will not change the overall shape of a planar surface. However, an error in the radius of an SMR can cause errors in other situations. This can readily be seen by considering the case in which an SMR is used to measure the distance between two planar surfaces, wherein one planar surface is to the left of the SMR and one planar surface is to the right of the SMR. If the true diameter is greater than the nominal diameter or reference diameter and if all other measurements are perfect, then the measured distance will be too small by twice the SMR radius error.

An error in SMR radius can also produce errors in measurements made on supports such as kinematic nests. FIG. 14A shows an example of a type of kinematic nest 1400, which in this case includes three spherical balls 1420 each affixed to a top surface 1412 of a base 1410 and separated from the other balls by 120 degrees. A support axis 1430 is an axis perpendicular to the plane that intersects the centers of the three balls 1420. The support axis 1430 is also equidistant from the centers of the three balls 1420 at any point along the support axis. FIG. 14B shows an arrangement 1450 in which a spherical exterior portion of an SMR 700 is placed on the kinematic nest 1400. As used herein, the term "kinematic" means that the SMR can be removed from and returned to the nest, with the 3D coordinates being nearly the same after the movement as before the movement. As the SMR 700 is rotated, the sphere center remains fixed in place on the support axis 1430. In some cases, a magnet is included in the base 1410 to hold a steel spherical exterior portion of an SMR firmly against the kinematic nest 1400 and to keep it from falling off the nest.

A way to describe the support axis 1430 in mathematical terms is as a locus of sphere centers for spheres of different sizes mounted on the nest. In other words, a sphere with a relatively small radius and a sphere with a relatively large radius will both lie on the support axis 1420. Of course, there is some minimum and maximum sphere size that will properly fit onto the three balls 1420, but within the acceptable range of sphere sizes, the locus of sphere centers will lie on the support axis 1430.

SMRs are provided by manufacturers with a nominal radius. Application software performs calculations based on the nominal radius of an SMR, the nominal radius being a numerical value provided by the SMR manufacturer. Differences in values for the nominal radius and the actual radius can result in errors, as is discussed further hereinbelow.

A nest, such as nest 14A, does not in general have a clearly defined reference point. A convenient and consistent reference point for a combination of a particular nest with a particular SMR is an "ideal support position," which is a position on the support axis 1430. The ideal support position is defined as the position on the support axis 1430 of the sphere center for a sphere having a radius exactly equal to the nominal radius. An SMR having a radius different than the nominal radius will have a sphere center at a different position on the support axis referred to as the actual support position.

Because neither measurement of a radius nor corrections to 3D coordinates based on radius error depend on the internal reflecting mechanism of the retroreflector, the methods for correcting radius discussed herein are not limited to an SMR having an open-air cube corner retroreflector. The methods are equally applicable to an SMR that includes a glass cube corner retroreflector, which is to say, a retroreflector that includes a glass prism having three perpendicular reflecting faces. The methods are also applicable to the case of a cateye retroreflector in which the retroreflector has a glass optical element shaped either as a single sphere or as two hemispheres cemented together, wherein the optical element is placed at least partially within a cavity in a spherical exterior portion. SMRs that include glass prism or cateyes are well known in the art.

As stated hereinabove, the measured radius minus the nominal radius is the radius delta. Let the support axis 1430 be positive in a direction from a plane connecting the centers of the three spheres to the sphere center of an SMR held by the nest. In other words, in FIG. 14A, the direction to the right is considered positive along the support axis 1430. Then the ideal support position may be found by measuring the 3D coordinates of the sphere center of an SMR in the nest 1400 and translating the 3D coordinates along the support axis in the negative direction by a distance approximately, but not exactly, equal to radius delta. The exact amount of translation also depends on the geometry of the nest 1400, as explained hereinbelow with reference to FIG. 15. A formula may be used to determine the ideal support position as a function of the radius error or delta. Compensation values such as coefficients may be stored in memory for use by the processor, in the device 10 or a separate computer 80, for example, may be used in determining the 3D coordinates of the ideal support position.

Figure 15:
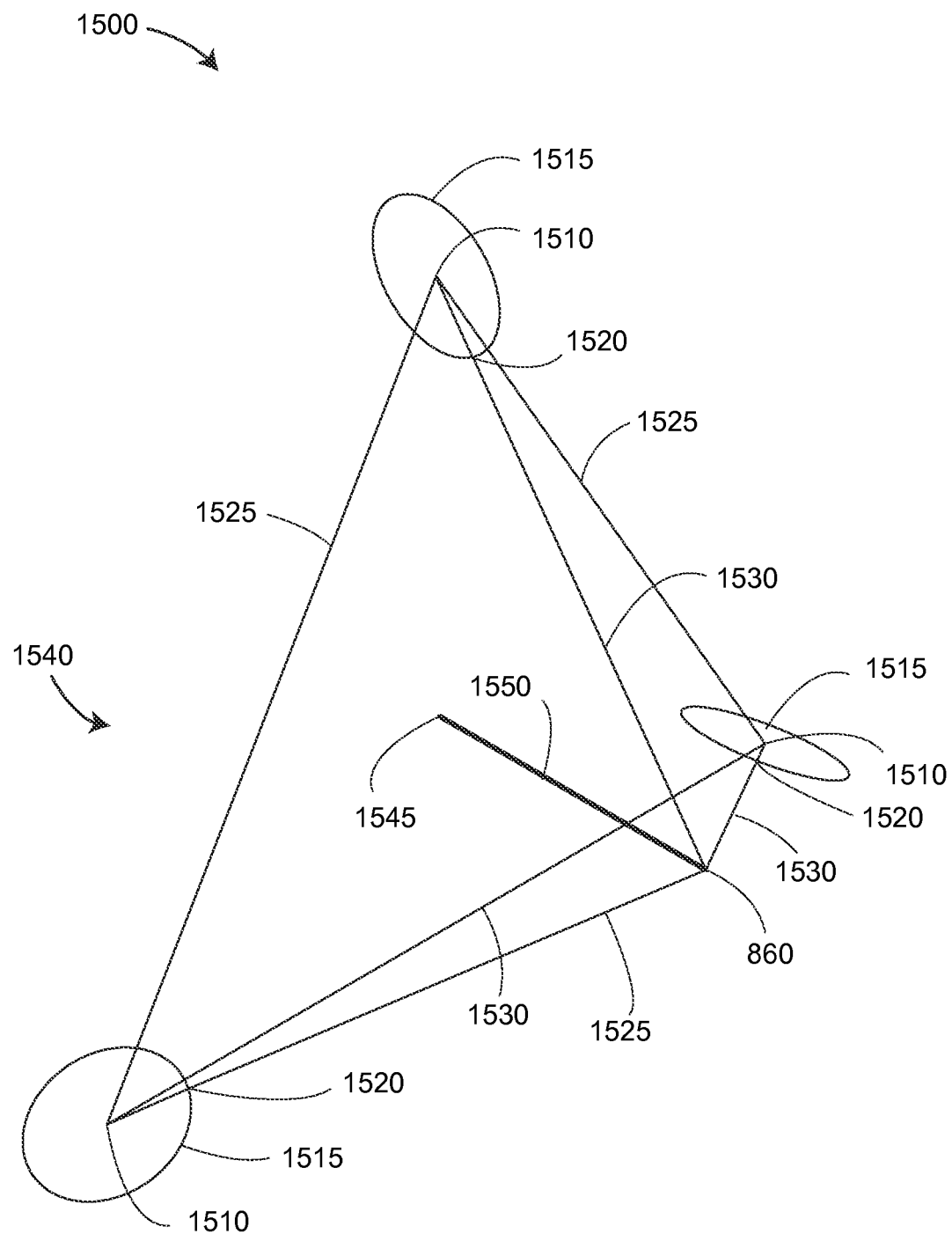
FIG. 15 shows a mathematical model of the kinematic nest of 14A.

The amount of shift in the sphere center 860 is now calculated for the case of an SMR 700 supported by a kinematic nest 1400 having three balls 1420 separated by 120 degrees. FIG. 15 shows line segments corresponding to elements of the nest 1400 and SMR 700 of FIG. 14B. Each of the three spheres 1420 has a center 1510, with any two of the centers 1510 separated by a base distance 1525, which is given a mathematical symbol a. A cross section drawn through the centers of each ball shows an outline 1515. Each of the balls contacts the spherical exterior portion 720 of the SMR 700 at a tangent point 1520. A line drawn from the sphere center 860 through a tangent point 1520 passes through the center 1510 of a ball 1420. The SMR has a reference or nominal radius R and a radius error e so that the actual radius of the SMR is R+e. The three lines 1525 form base of a triangular pyramid 1540. The lines 1530, which extend from the ball centers 1510 to the sphere center 860, form the edges of the triangular pyramid. The radius of each ball is r so that the edges of the triangular pyramid have length R+e+r. The altitude segment 1550 of the pyramid, which has a height h, extends from a base center 1545, which lies on the plane connecting the three ball centers 1510, to the sphere center 860. Each of the vertices 1510 of the base has an angle of 60 degrees, and so a line drawn from a ball center 1510 to the base center 1545 has length $b=a/\sqrt{3}$. By the Pythagorean Theorem, the height of the altitude segment is $h=\sqrt{(R+e+r)^2-b^2}$. Let the edge length be $R_0$ and the height be $h_0$ for a radius error of $e=0$. Using the binomial approximation, it can be shown that, to good accuracy, the change in the height h as a result of an error e is $\delta h = eR_0/h_0$.

Because the height $h_0$ is smaller than the edge length $R_0$, the change in height $\delta h$ is somewhat larger than the radius error e. For example, for a radius error of 1 micrometer, the change in height $\delta h$ is 1.048 micrometers. The reason that the change in height is larger than the radius error is that a larger SMR 700 intersects the balls 1420 slightly farther away from the base that connects the ball centers 1510.

In general, the change in height $\delta h$ depends on the construction (geometry) of the SMR nest 1400 and is different for different types of nests. In order to correct as accurately as possible for the effect of the radius error on the change in height, it is necessary to know both the amount of radius error and the type of nest being used with the SMR. To get an approximate correction for the effect of the radius error on the change in height, the radius error e may be used without considering the geometry of the nest. For the example given in the last paragraph, the relative error in the calculated height resulting from not considering the geometry of the nest 1400 was 4.8%.

An example is now given of the effect of SMR radius errors on measurements made with SMRs in nests. FIGS. 16A, 16B show front and side views, respectively, of a first SMR 700A and a second SMR 700B held by a first nest 1400A and a second nest 1400B, respectively. In an ideal case in which the radius of both 700A and 700B is equal to the reference radius, the length between the SMR centers is indicated in FIG. 16C by the arrow 1672. Consider next a case in which the sphere radius of the first SMR 700A is equal to the reference radius while the sphere radius of the second SMR 700B is larger than the reference radius. For the SMR 700B, the sphere center is pushed upwards, as indicated by the arrow 1674. Consequently, the measured 3D coordinates lead to the vector 1676. If the length of the vector 1672 is $L_1$ and the length of the vector 1674 is $\delta h$, then the difference in the lengths 1672 and 1676 is $\Delta L = \sqrt{L_1^2 + \delta h^2} - L_1$, which after applying the binominal approximation, is given to good accuracy as $\Delta L = \delta h^2 / 2L_1$. Taking as an example $\delta h = 2$ micrometers and $L_1 = 2$ meters, the resulting error is $10^{-6}$ micrometers, which is negligible.

In contrast, FIGS. 17A, 17B show the situation in which the first SMR 700A and first nest 1400A are aligned as in FIG. 16B, while the second nest 1400B is oriented perpendicular to the line connecting the sphere centers of 700A, 700B. In an ideal case in which the radii of both 700A and 700B are equal to the reference radius, the length between the SMR centers is indicated in FIG. 17B by the arrow 1752. Consider next a case in which the sphere radius of the first SMR 700A is equal to the reference radius while the sphere radius of the second SMR 700B is larger than the reference radius. For the SMR 700B, the sphere center is pushed to the left, as indicated by the arrow 1754. Consequently, the measured 3D coordinates lead to the vector 1756, which is too short by the offset value 1754. The offset value 1754 depends both on the delta (or radius error) and on the geometry of the nest, as explained hereinabove. In this case, if the sphere radius of 700B is too large by 2 micrometers and the nest geometry is the same as that given in the previous example, the measured distance between the two SMRs will be too small by 2.096 micrometers. In other words, for the situation in FIGS. 16A, B, the error in the measured length between the SMRs was not affected by a diameter error in one of the SMRs while, for the situation in FIGS. 17A, B, the error in the measured length between SMRs is directly affected by a diameter error in one of the SMRs.

It is clear from the discussion hereinabove that in many situations the direction of the support axes 1430 of two nests can have a large effect on the uncorrected distance measured between SMRs placed in the nests. There are several ways that a direction of a support axis 1430 can be obtained. First, the operator may indicate the direction of the support axis in application software. Second, a nest may be mounted directly on an object having surfaces known in a CAD model, from which the direction of the support axes 1430 may be determined. Third, measurements may be made to an inspection plan that includes the direction of the support axis 1430 of each nest used in the inspection. Fourth, the operator may measure features of the nest to determine the direction of the support axis 1430. For example, in the case of the nest 1400 of FIG. 14A, the operator may use the device 10 with an SMR to measure 3D coordinates of points on the top surface 1412. These 3D point coordinates are fit to a plane from which the perpendicular support axis 1430 is found.

In general, to correct for errors for measurements made with SMRs placed in nests, both the direction of the support axis 1430 and the magnitude of the radius delta is needed. A more accurate correction is possible if the geometry of the nest is also taken into account as discussed with reference to FIG. 15.

Figure 18:
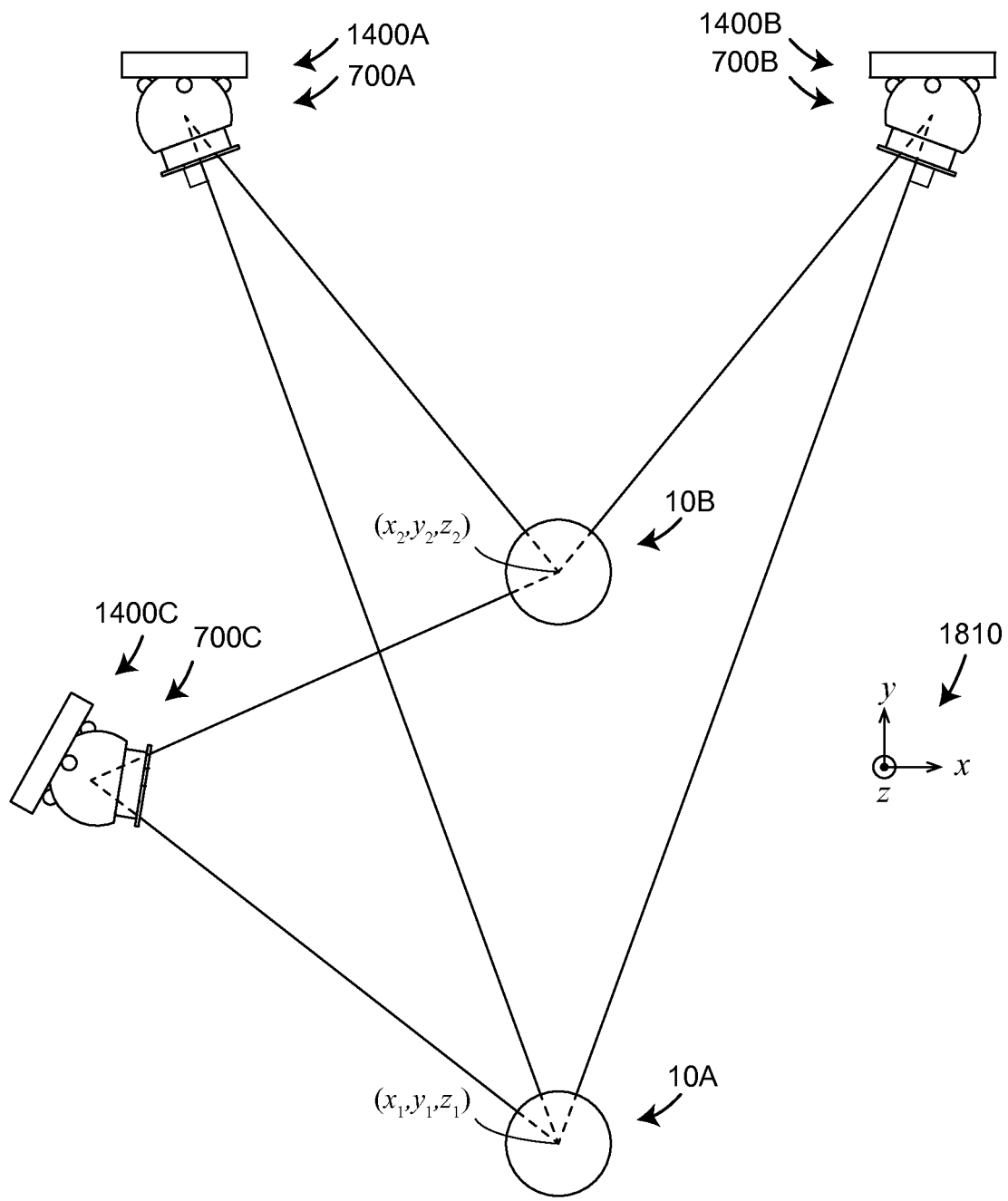
FIG. 18 illustrates a method of obtaining accurate 3D measurements of an SMR sphere center for a device located at two stations while performing an SMR alignment at a single station.

A procedure described with reference to FIG. 18 is useful whenever the same SMR positions must be measured with a tracker moved to multiple locations. For example, a calibration procedure may require that a distance between two SMRs 700A, 700B be measured with the tracker set away from the SMRs by two different locations 10A, 10B as shown in FIG. 18. In other cases, the tracker may be required to measure three or more nests from multiple locations as a way of putting tracker measurements made from different locations into a common frame of reference.

In a first step of a method, two or more SMRs 700A, 700B are rotated in supports 1400A, 1400B to align the axis of symmetry 840 of each SMR to a 3D measurement instrument located at a first position having 3D coordinates $(x_1, y_1, z_1)$ within a frame of reference 1810. At this first position, the tracker is given reference number 10A. This alignment may be achieved, for example, using one of the alignment methods of FIGS. 13A-F. The tracker at 10A measures the SMRs 700A, 700B and at least one additional retroreflector 700C, which need not be aligned to the tracker 10A. In a second step, the same 3D measurement instrument is designated as 10B when located at a second position having 3D coordinates $(x_2, y_2, z_2)$. In this step, the SMRs 700A, 700B are not further rotated but left in their initial orientations. The tracker 10B measures the 3D coordinates of the vertex of 700A, 700B, and 700C. The 3D coordinates of the vertices of SMRs 700A, 700B as measured by the 3D measurement instrument 10B are mathematically corrected to account for the misalignment of the vertex 820 with respect to the sphere center 860 of each of the SMRs 700A, 700B.

The mathematical method for doing this is easy to understand. Using the measured values for the retroreflector vertices for 700A, 700B, 700C, the tracker 10B is put into the frame of reference of the tracker at 10A. This is done using optimization methods in which the six degrees of freedom (for example, x, y, z, pitch, roll, yaw) of tracker 10B are adjusted until the 3D coordinates for 700A, 700B, and 700C measured by tracker 10A and 10B match as closely as possible. The usual optimization method is one in which the sum of the squared residual errors is minimized.

The transformation matrix needed to 3D coordinates measured by 10B into the frame of reference of 10A can be used to transform the SMR error vectors for 700A, 700B in 10A into the error vectors for 700A, 700B in 10B. In this way, the step of realigning the SMRs 700A, 700B prior to measurement by tracker 10B can be eliminated.

It should be understood that the method of establishing a transformation matrix by measuring the 3D coordinates of at least three retroreflector targets from at least two locations may be carried out even in the absence of SMRs. In other words, cube corner retroreflectors or other types of retroreflectors may be affixed to any sort of object. It should also be understood that the method described herein may be used to correct the 3D coordinates of a single SMR or multiple SMRs when viewed from two or more stations.

As explained hereinabove, a type of preferred orientation of an SMR is one in which the SMR reference ray 940 is aligned in a prescribed manner to a measurement line as a way of minimizing error in measuring a dimensional characteristic associated with the measurement line. A case is now considered in which the dimensional characteristic of interest is a length between two points.

Figures 19A, 19B:
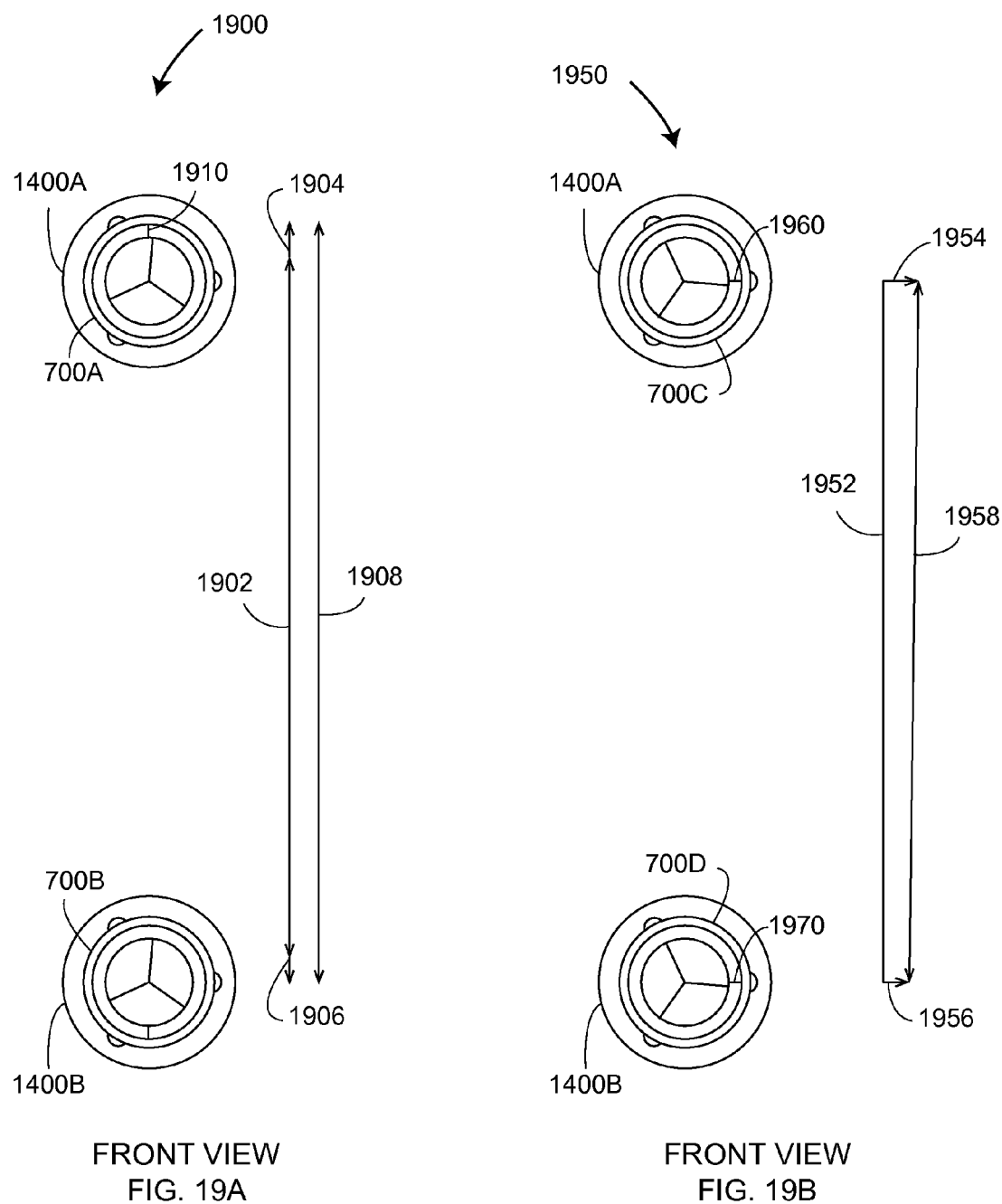
FIGS. 19A, 19B illustrate that the direction of the maximum runout error vector component, which may in an embodiment be aligned to a reference point on the SMR, may have a significant effect on measurement error.

In a measurement shown in FIGS. 19A, 19B, nests 1400A, 1400B have SMR runout reference angles 950 of zero. The nest 1400A is mounted directly above the nest 1400B, and a 3D coordinate measurement device such as tracker 10 is used to measure the vertical distance between an SMR 700A placed in nest 1400A and an SMR 700B placed in nest 1400B. In FIG. 19A, the SMR 700A is rotated within the nest 1400A so as to place its runout reference line 1910 in the vertical direction toward the top of the SMR 700A. The SMR 700B is rotated within the nest 1400B so as to place its runout reference line 1920 in the vertical direction toward the bottom of the SMR 700B. The true distance between the sphere center of SMR 700A and the sphere center of SMR 700B is indicated by the line 1902. The SMR runout error vector for SMR 700A is indicated by the vector 1904 and the SMR runout error vector for SMR 700B is indicated by the vector 1906. The resulting measurement of the length between the sphere centers is off by an amount equal to the sum of the magnitudes of the vectors 1904 and 1906. These errors appear in the measured length represented by the length 1908.

In FIG. 19B, the SMR 700C is the same as the SMR 700A, but the SMR 700A is rotated to place the runout reference line in the horizontal position, which is the position at which it is perpendicular to the line connecting the centers of the SMRs in the nests 1400A and 1400B. The SMR 700D is the same as the SMR 700B, but the SMR 700D is rotated to place the runout reference line in the horizontal position. The true distance between the sphere center of SMR 700C and the sphere center of SMR 700D is indicated by the line 1952. The SMR runout error vector for SMR 700C is indicated by the vector 1954 and the SMR runout error vector for the SMR 700D is indicated by the vector 1956. The resulting length 1958 has a length that is close to the true length 1952. The error resulting from the calculation of the length 1958 is known as a cosine error which is often negligible, as shown in the example given for FIG. 16.

The error in the measurement of FIG. 19A could have been made smaller if the runout reference lines for 700A, 700B had both been aligned either up or down; however, the results in general are much better if the runout reference lines are rotated perpendicular to the line connecting the sphere centers of the two SMRs. This is true not only for a vertical direction but for any direction connecting two SMRs.

To simplify the alignment of the SMR runout, it is convenient for the operator to know the direction of the maximum runout error vector component. This is easily accomplished if the reference point is aligned to the maximum runout error vector component, in other words, if the SMR runout reference angle is set to zero. Alternatively, it could be set to 180 degrees or another easily understood value such as +90 or –90 degrees. This angle is a preferred and predetermined angle in the sense that each SMR produced by a manufacturer has the reference point at the same position relative to the maximum runout error vector.

Figure 19C:
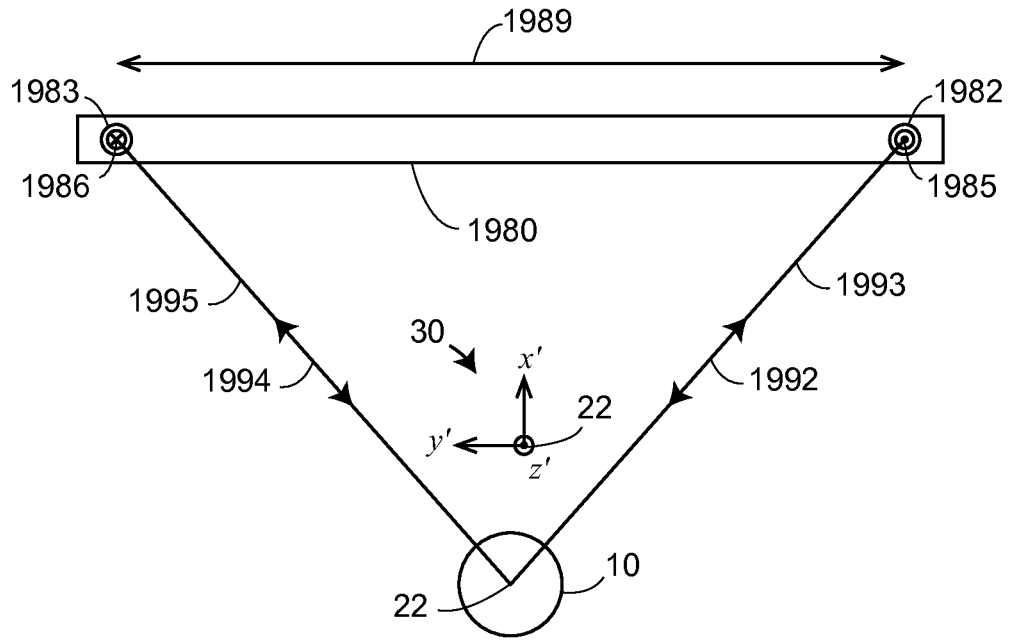
FIGS. 19C, 19D illustrate a general approach to aligning a runout error vector component to minimize measurement error.
Figure 19D:
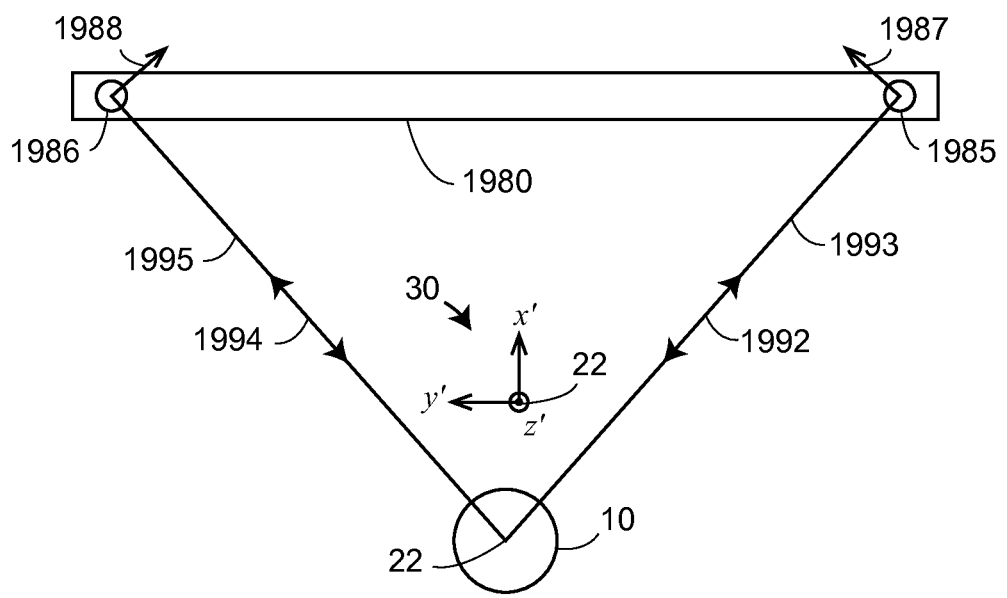

The method of aligning a reference mark can also be applied to minimize errors in dimensional measurements in addition to the measurement of length. An example of a dimensional measurement of a small displacement in the positions of the first SMR 1982, 1983 in the direction x'. The orientation of the reference mark 932 shown in FIG. 19C is still correct for this case. In other words, were the objective to sensitively measure small displacements of either the first nest or second nest along the direction x', the nest reference marks should be oriented as shown in FIG. 19C On the other hand, if the objective were to sensitively measure small displacement of either the first nest or second nest along the direction z', the optimum position for the reference mark 932 would be different. In this case, the SMR runout error component should be perpendicular to the direction to be measured. As shown in FIG. 19D, the SMR reference ray 940 should be oriented perpendicular to the beam direction but in the x'-y' plane. There are two possible orientations in this case, to the left of the beam as in 1987 or to the right of the beam at 1988. The SMR reference may be oriented to minimize error in the measurement of other dimensional quantities, as will be clear to one of ordinary skill in the art.

Figure 20A:
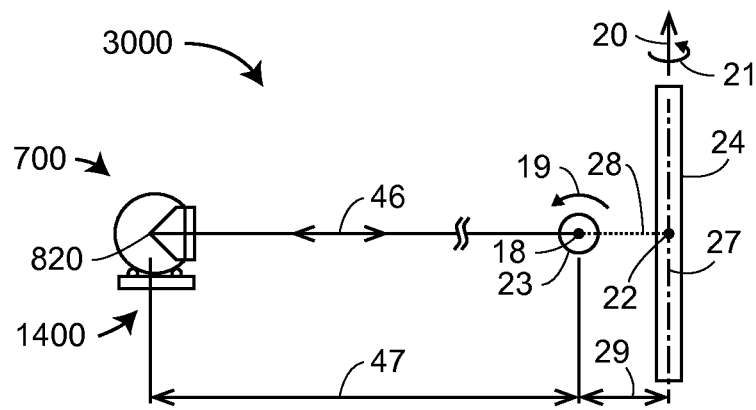
FIGS. 20A, 20B show a distance measurement made to an SMR in frontsight and backsight modes, respectively.

FIG. 20A shows a schematic representation 3000 of the azimuth axis 20 and zenith axis 18 described in FIG. 1. Also shown are the azimuth mechanical axis (axle) 20 and the zenith mechanical axis (axle) 23 corresponding to the azimuth axis 20 and zenith axis 18, respectively. The azimuth mechanical axis 24 rotates about the azimuth axis 20 by an angle 21. The azimuth axis 20 corresponds to a centerline 27 of the azimuth mechanical axis 24. The zenith mechanical axis 23 rotates about the zenith axis by an angle 19. A perpendicular line 28 is drawn between the azimuth axis and the zenith axis at the point of closest approach of the two axes. The perpendicular line 28 intersects the centerline 27 in a point 22. The length 29 of the perpendicular line between the azimuth axis 20 and zenith axis 18 is the axis offset (AXOF) length 29. Because in the mechanical arrangement of FIG. 1, the payload 15 rotates about the zenith mechanical axis, while the zenith mechanical axis rotates about the azimuth mechanical axis, which is attached to the fixed base, it follows that there the intersection point 22 is stationary with respect to the device frame of reference 30 of FIG. 1. For this reason, the point 22 may be considered to be the gimbal point of the device 10, that is to say the point about which the azimuth and zenith mechanical axes rotate. Notice, however, that the zenith axis 18 does not exactly rotate about the gimbal point 22. However, mathematical compensations can be made so that all rotations are referenced to the gimbal point. After making small compensations for beam offset and beam tilt, the beam of light 46 appears to emerge from a beam rotation point on the zenith axis 18.

To summarize, it is mathematically convenient and customary in the art to select a gimbal point 22 as a stationary point within the device 10 and to refer 3D coordinates measured by the device 10 back to this point. This means that mathematical compensations are made to account for non-ideal aspects of real-world mechanical axes. One such non-ideal aspect is the axis offset 29. Another non-ideal aspect of the mechanical axes is axis non-squareness. In an ideal mechanical system, the azimuth and zenith axis are exactly perpendicular. In a real system, there is small deviation from perpendicularity, which is an angular value called the axis non-squareness value. To get the measured 3D coordinates, mathematical methods are used to correct the distance and two angles measured by the device 10 to refer these values to the gimbal point 22.

In a similar manner, in an ideal device 10, the beam of light 46 passes virtually through the gimbal point 22. In a real system, the beam of light is offset from the gimbal point 22 first by an axis offset distance 29. In addition, the beam of light 46 is offset from the beam rotation point (on the zenith axis 18). The offset is a small distance value in y" and z" in the y"-z" plane of the payload frame of reference 35 shown in FIG. 1.

In an ideal device 10, the beam of light 46 emerges from the device in a direction perpendicular to both the azimuth axis and the zenith axis. In a real device 10, the beam of light 46 emerges slightly off this idea angle. To move measured distance and two angles to coordinates with the tracker frame of reference, with the gimbal point as the origin, parameters may be used to mathematically account for these effects and reference all measurements to the origin. For example, in the type of beam steering mechanism described in device 10 of FIG. 1, the parameters TX, TY may account for beam offsets, and the parameters RX, RY may account for the beam tilts (with respect to the ideal). It should be understood that other beam steering mechanisms, for example, mechanisms that use mirrors, will have different methods of compensating for the mechanical and optical imperfections in the system, but that the general principles discussed herein are applicable to all such beam steering mechanisms.

It is necessary to provide a reference distance for the distance meter within the device 10. Since the beam of light from the distance meter appears to emerge from the beam rotation point, it is necessary to provide a way to refer any measured distances to this point. Methods for doing this are discussed in detail hereinbelow.

The frontsight mode of the device 10 is its usual mode of operation. The device illustrated in FIG. 20A is in the frontsight mode. In the figure shown, the zenith axis 18 is in front of the azimuth axis 20, but it could equally well have been on the other side of (in back of) the azimuth axis. The term frontsight mode simply indicates that this is the normal mode of operation of the device as defined by the device manufacturer.

Figure 20B:
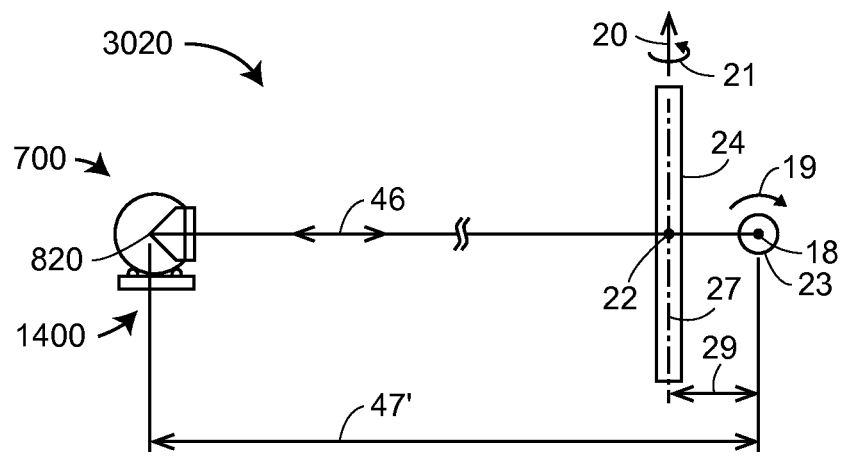

Another mode of operation of the device is the backsight mode. To get into the backsight mode, starting from the frontsight mode, the payload is rotated about the azimuth axis by 180 degrees and rotated about the zenith axis to point the beam of light 46 back at the retroreflector target. As shown in FIG. 20B, an effect of putting the device 10 in to backsight mode is to place the zenith mechanical axis on the opposite side of the azimuth mechanical axis. In other words, if the axis offset parameter is positive in the frontsight mode, it will be negative in the backsight mode, and vice versa. For the case in which a vertex 820 of an SMR 700 is placed in line with the line of closest approach 28 as in FIGS. 20A and 20B, the backsight distance 47' minus the frontsight distance 47 is equal to twice the axis offset value.

Figure 20C:
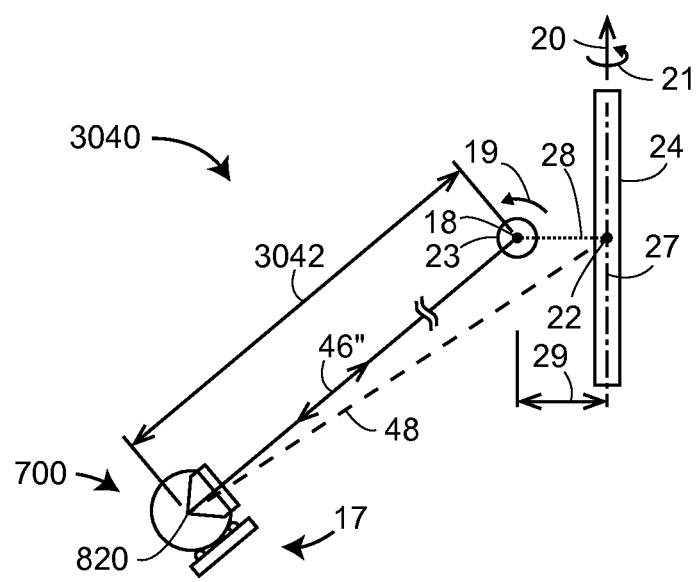
FIG. 20C shows a distance measurement made to a home position.

FIG. 20C shows a schematic representation 3040 of the device 10 sending a beam of light to an SMR 700 for the case in which the SMR is placed in a home measurement nest 17 of FIG. 1. The beam of light 46" is emitted from the beam rotation point. In an embodiment, the distance meter is set to have a distance of zero at the point 18 in the frontsight mode. It reads a distance 3042 when the SMR 700 is placed in the home position nest 17. The distance read by the device 10 with respect to the gimbal point 22 (following compensations), however, is a distance 48 from the gimbal point 22 to the vertex point 820.

To establish the beam rotation point as the zero point for the distance meter, a separate procedure is carried out as is now described with reference to FIGS. 21A-C. In a first step illustrated in schematic representation 3100 of FIG. 21A, a distance is measured between two SMR center positions. One way to measure this distance is to align a gimbal point 3112 of a laser tracker to a line that connects the centers of the two SMRs. The sphere center of the SMR 3120 when placed in the nest 3130 may be referred to, for the purpose of this discussion, as the first nest center. The sphere center of the SMR 3120' when moved to the second nest 3130' may be referred to as the second nest center. A line connecting the first nest center and the second nest center may be called the sphere center line. That portion of the sphere center line that lies between the first sphere center and the second sphere center is called the interior portion of the sphere center line, and that portion of the sphere center line excluding the interior portion is the exterior portion.

The gimbal point 3112 of the device 3110 is placed at a point on the exterior portion. The distance 3124 of the beam of light 3114 from the gimbal point 3112 to the vertex point 3122 of the SMR in the first nest is measured. The SMR is moved to the second nest 3130'. The distance 3126 of the beam of light 3116 from the gimbal point to the vertex point 3122' of the SMR in the second nest is measured. The distance 3126 minus the distance 3124 is the distance between the vertex point 3122 and the vertex point 3122. However, for the geometry of FIG. 21A, the SMR depth error is common mode and cancels out for the two length measurements. Hence the difference in the distances 3126 and 3124 is also the distance between the sphere centers of the SMRs 3120 and 3120'.

Figure 21A:
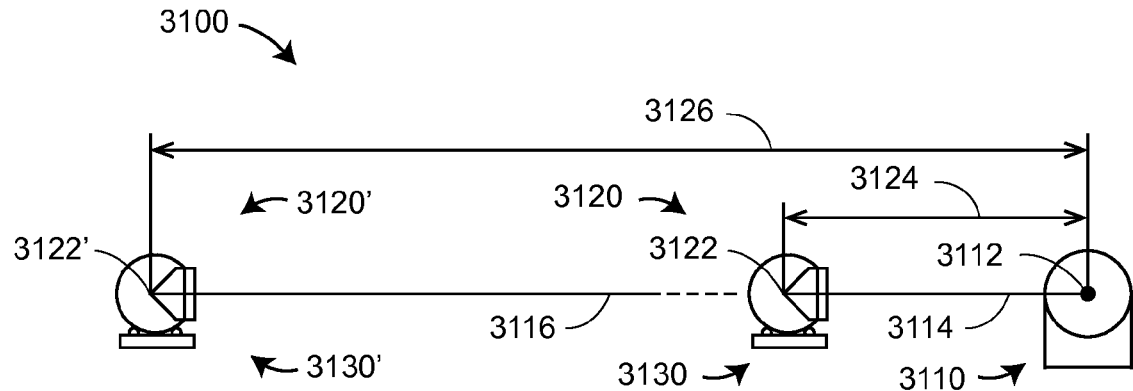
FIG. 21A shows a method for measuring a distance between two spherically mounted retroreflectors.
Figure 21B:
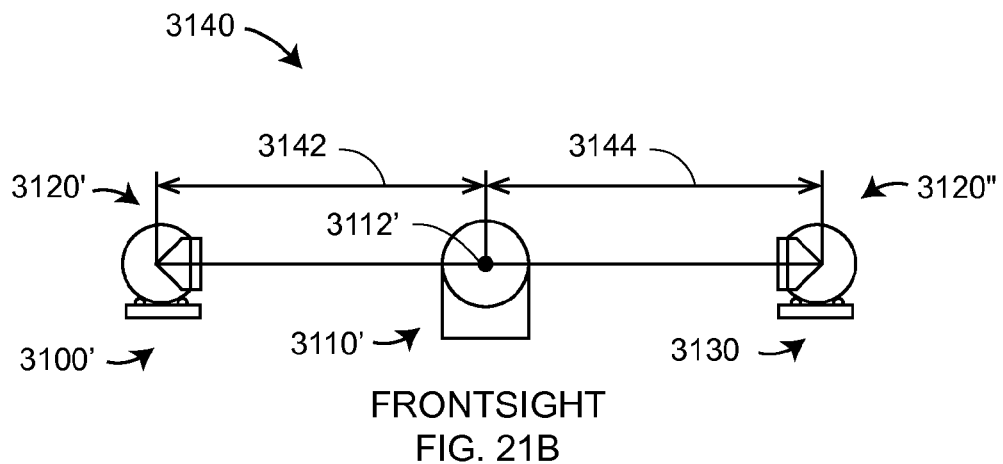
FIG. 21B shows a method for determining finding an offset error in measured distance.
Figure 21C:
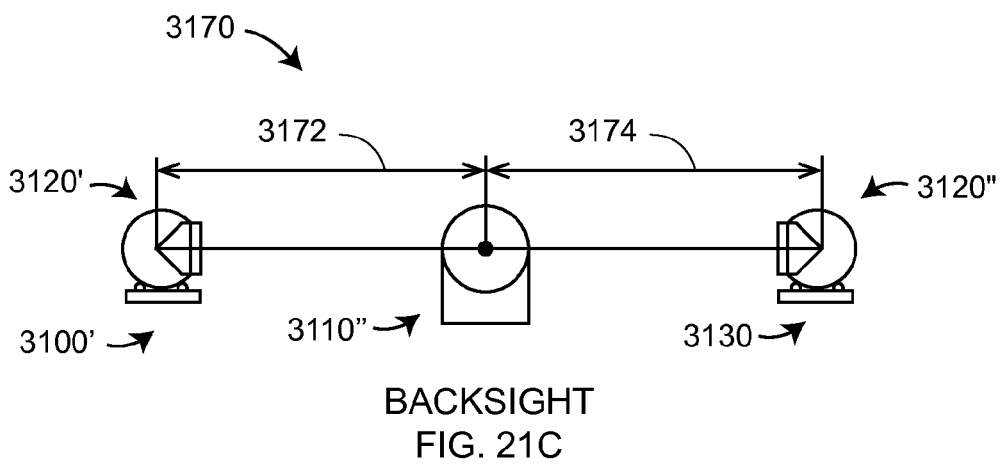
FIG. 21C shows a method for finding the axis offset value for a coordinate measurement device.

Two additional steps illustrated in FIGS. 21B, 21C may be carried out to set the distance 3042 to set the distance meter to have a distance of zero at the beam rotation point (on the zenith axis 18). In a first step illustrated in schematic representation 3140, the device in its frontsight mode is placed so that a gimbal point 3112' of the device 3110' is on the interior portion. The distance meter measures the distance 3142 from the gimbal point 3112' to the vertex of the SMR 3120' and the distance 3144 from the gimbal point 3112' to the vertex of the SMR 3120". In a second step illustrated in the schematic representation 3170 of FIG. 21C, the device 3110" is placed in backsight mode. The measurements to the two SMRs are repeated to obtain distances 3172 and 3174.

The distance 3126 should equal the sum of distances 3142 and 3144 if the distance meter is correctly zeroed to the beam rotation point (on the zenith axis 18). To correct for any discrepancy from the ideal, an offset distance is calculated using the formula offset distance=(distance 3126−(distance 3142+distance 3144))/2. The offset distance is added to each distance reading. Equivalently, we can consider that the offset distance is set to zero the beam rotation point.

There are two different types of distance meters—absolute and incremental—that are reset somewhat differently. In the case of an incremental distance meter such as an interferometer, the distance is set to a known value at a given point. For example, it could be that a laser beam sent to an SMR sent to a home position nest is expected to have a distance reading of 0.167 meters based on measurements made in a factory or laboratory. For an incremental distance meter, a beam of light is sent to the SMR in the home position and set to read a value of 0.167 meter. Afterwards, the device may count the number of wavelengths shift in waves of light and multiply these by the wavelength of the light in question (in the local air medium) to get the total change in distance. This change in distance is added to the original distance to get the distance at any later time.

In the case of an absolute distance meter (ADM), a beam of light may again be sent to a distance meter, but in this case the distance read by the distance meter is compared to the known distance, which might again be 0.167 meter. One or more parameters associated with the measurement of the ADM, such as a phase offset parameter, for example, are adjusted to give the expected reading of 0.167 meter. Thereafter the adjusted parameter(s) continues to be used in making corrections to the ADM readings.

Although the way of resetting a distance meter is somewhat different in the two cases—resetting to a distance for the incremental distance meter and resetting parameters for the ADM—in both cases, it is necessary to send the beam of light from the device to the vertex of the SMR before making the necessary compensations.

FIG. 21C is a schematic representation 3170 that illustrates a way to determine the axis offset value 29. With the device in the backsight mode, the distance meter measures distances 3172 and 3174. The axis offset value is calculated with the formula axis offset value=((distance 3142+distance 3144)− (distance 3172+distance 3174))/4. The axis offset value is used in transforming the measured distance and two angles into a 3D coordinates in a coordinate system 30 centered on the gimbal point 22.

The methods for setting the zero distance value for the distance meter in the device 10 discussed hereinabove have shown the distances measured by the distance meter taken with respect to the SMR vertex points 820. However, each SMR has its own depth error, which means that the method of FIG. 21 will give different results depending on the SMR or SMRs used. A way around this problem is to use SMR compensation parameters to measure to the SMR sphere center(s) rather than the sphere vertex. For the case shown in FIG. 21B, it is usually the case that the axis of symmetry of the SMRs 3120' and 3120" can be aligned to the beams of light from the device 3110'. In this case, the effect of the runout error is negligible. For example, suppose that the SMR runout error for the SMR 3120" is 12 micrometers, with the distance from the gimbal point 3112' equal to 2 meters. The error in the measured length is $\sqrt{2^2+(12\cdot 10^{-6})^2}-2$ m=$3.6\cdot 10^{-5}$ µm, which is a negligible value. As long as the axis of symmetry of the SMRs 3120' and 3120" can be well aligned to the beams from the device 3110', it is only necessary to increase or decrease the measured distances 3142, 3144 to account for the SMR depth error. By making this correction, the method described above with reference to FIGS. 21A-21C will be accurate regardless of the SMR depth error.

Some variations are possible in the procedures described in reference to FIGS. 21A-C. The method of FIG. 21 may be modified by obtaining a reference artifact having a known distance between nests. The distance between spheres placed on the nests 3130 and 3130' may be measured once using a Cartesian CMM or interferometer. If testing is done in a constant temperature environment, say at 20° C., then the distance between the nests would not be expected to change, especially if the artifact is made of a material having a low coefficient of thermal expansion (CTE). For example, the artifact may be made of carbon fiber composite material having a low CTE, or it may be made of Invar or Super-Invar.

In another case, different SMRs may be placed in the nests 3130 and 3130' rather than shifting one SMR between nests. Using two SMRs in this way may save time in an automated procedure. In this case, the depth error of each SMR is accounted for separately in determining setting the distance meter to zero at the beam rotation point.

The discussion with regard to FIGS. 21A-C had to do with methods for setting the distance meter to read correct values or for applying compensation or correction values to distance readings. An important aspect of these corrections is to account for SMR depth error so that distance meter compensation is accurate regardless of the SMR depth error. In the case of a device 10 that has a home position nest 17, the end result of the procedures of FIGS. 21A-C is a numerical value called the home reference distance, defined as the distance from the rotation point (on the zenith axis 18) to the center of an SMR (of given diameter) placed in the home position nest.

For a device that does not have a home position nest, the end result of the procedures of FIGS. 21A-C is a correction to the distance meter itself. In other words, the processing of the distance meter is changed following the procedure to make the sum of the distance readings 3142 and 3144 equal the difference in the distance readings 3126 and 3124. Afterwards, this reset distance reading may be used to set a distance to a retroreflector fixed to the device. Such a fixed retroreflector may be measured whenever desired to remove drift from the distance meter As stated in the preceding paragraph, for a device having a nest that holds an SMR, the end result of the procedures of FIGS. 21A-C is a home reference distance, which is a numerical value. In an embodiment, this numerical value is made more accurate by correcting for SMR depth error. The home reference distance is saved within the memory of the device.

In routine use of the device 10, the home reference distance is used to correct the distance reading of an SMR placed at the home position nest 17. Such routine correction may be useful in correcting drift in the distance meter, which may occur over time and as a result of temperature changes and mechanical shocks. As explained in FIG. 20C and shown again in FIG. 22, a beam 46 may be sent to a vertex point 820 of an SMR 700 in a home position nest 17. If possible, the axis of symmetry of the SMR is aligned to the beam of light from the device. When this is possible, the distance meter may be set a distance 3042 to the vertex 820 based on the home reference distance and the SMR depth error without considering the SMR runout error vector component. For example, suppose that the SMR has a sphere radius of 0.75 inch=19.05 mm, with its sphere vertex 820 a distance of 0.167 meter from the beam rotation point on the zenith axis 18. Further suppose that the SMR runout error is 0.0005 inch=12.7 micrometers. The SMR runout error produces an error in the measured distance of $\sqrt{0.167^2+(12.7\cdot 10^{-6})^2}-0.167$ m=$4.83\cdot 10^{-10}$ m, which is negligible.

In some cases, it is not possible to align the axis of symmetry of the SMR 700 with the beam direction 46. For example, in FIG. 22 the collar 905 cannot be aligned to the axis of symmetry with having the collar come into contact with the nest surface. Such contact is to be avoided as it can cause the SMR to rise off the nest contact points, thereby causing an error.

In this case, it is advisable to account for the effects of the SMR runout error vector component as well as the SMR depth error. This may be done in two steps. In a first step, the SMR is placed in the nest with the collar a certain distance off the nest surface. For example, a prescription might be to lower the collar until it touches the nest surface and then raise the nest by 2 mm. Assuming that the operator can adjust the collar to within one millimeter of the desired value for an SMR having a radius of 19.05 mm, alignment is obtained to within about ±3 degrees. In a second step, the SMR is aligned to place the reference point 932 at a specified orientation. For example, the prescription might be to reference point 932 at the uppermost SMR position. The calculations discussed hereinabove with respect to FIGS. 9C, 9D and 12A, 12D can then be carried out to correct the distance reading to account for the vector error. In other words, the home reference distance, which is a value intended for the sphere center of an SMR in the home position nest 17 is adjusted for the vector error to set the distance for the SMR vertex point, which is the actual point measured by the device 10. An alternative way to carry out the second step is to use the camera 56 of FIG. 1 to determine the orientation of the SMR, as discussed hereinabove.

Figure 23:
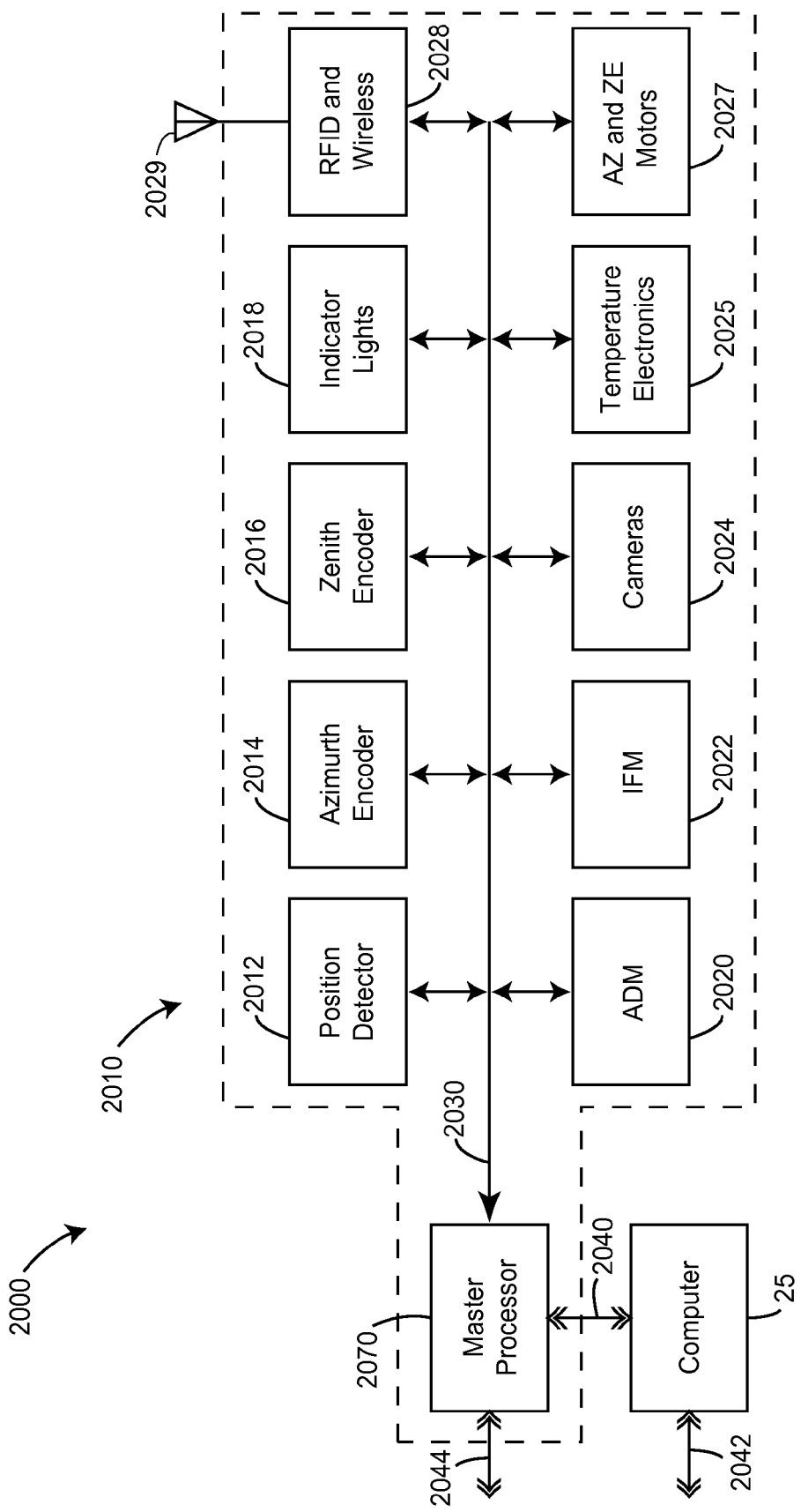
FIG. 23 shows electronics and processors within a laser tracker according to an embodiment.

FIG. 23 shows electrical and computing components 2000 within and outside the laser tracker 10, which is representative of a device used to measure an SMR. These electrical and computing components are merely representative, and it should be understood that other configurations are possible. A master processor 2070 sends and receives data messages to processors within the laser tracker. These messages may be sent over a wired, optical, or wireless device bus 2030. Processing may be independently carried out for functions within the laser tracker 10. For example, there may be a position detector processor 2012, azimuth encoder processor 2014, zenith encoder processor 2016, ADM processor 2020, interferometer processor 2022, locator cameras processor 2024, indicator lights processor 2018, temperature electronics processor 2025, azimuth (AZ) and zenith (ZE) motor processor, and RFID and wireless processor 2028. The RFID and wireless processor 2028 may be connected to an antenna 2029 for emitting or receiving radio frequency (RF) signals. The term processor as used herein is intended to include not only computing devices, which might include microprocessors, FPGAs, and DSPs, but also electronic circuitry to perform functions needed to condition the signals to be sent to a computing device or memory. Such electronic circuitry might include, for example, analog-to-digital converters or temperature determination electronics. The master processor 2070 may be enclosed in a box such as the interface box 70 of FIG. 2. Alternatively, it may be integrated into the electronics internal to the tracker body. The signals from the master processor may go to an external computer 25 or be connected to a network 2044, 2042.

An electrical memory component within 2000 may be used to store information. Such information may be used by the processor or may be transmitted to a remote processor by wired or wireless means. The information may include a serial number and SMR parameters as discussed hereinabove.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of measuring a spherically mounted retroreflector (SMR) with a device, the method comprising the steps of:

providing a first SMR, the first SMR including a first body and a first retroreflector, the first SMR including a first reference point, the first body having a first spherical exterior portion that has a first sphere center and a first sphere radius, the first body containing a first cavity, the first cavity sized to hold the first retroreflector, the first cavity open to a region outside the first body, the first retroreflector at least partially disposed in the first cavity, the first retroreflector being an open-air cube-corner retroreflector, the first retroreflector having a first set of three mutually perpendicular planar reflectors that intersect in a first set of three lines and in a common first vertex point, the first cavity including an air-filled region interior to reflecting surfaces of the first set of three planar reflectors, the first retroreflector having a first axis of symmetry relative to the first set of three lines, the first SMR having a first SMR runout plane perpendicular to the first axis of symmetry and passing through the first sphere center, the first SMR having a first SMR intersection point, the first SMR intersection point being a point of intersection of the first axis of symmetry with the first SMR runout plane, the first SMR having a first error vector extending from the first vertex point to the first sphere center, the first SMR error vector having a first SMR depth error vector component and a first SMR runout error vector component, the first SMR depth error vector component being a vector that extends from the first vertex point to the first SMR intersection point, the first SMR runout error vector component being a vector that extends from the first SMR intersection point to the first sphere center, the first SMR depth error vector component having a magnitude equal to a first SMR depth error;

providing the device, wherein the device has a device frame of reference fixed with respect to a base of the device and a light source that emits a first beam of light, the device being configured to measure a target distance and two target angles from the device to the first vertex point, the two target angles given with respect to the base;

providing a processor and a memory;

providing computer readable media having computer readable instructions which when executed by the processor calculates first three-dimensional (3D) coordinates of the first sphere center in the device frame of reference;

determining the first SMR depth error and the first SMR runout error vector component;

storing as first stored values the first SMR depth error and a numerical representation of the first SMR runout error vector component;

reading by the processor the first stored values; and performing a first measurement, the first measurement including steps A through J:

A) providing a rule for orienting the first SMR to obtain a first preferred orientation of the first SMR;

B) determining, by the operator, the first preferred orientation of the first SMR based at least in part on the rule;

C) orienting, by the operator, the first SMR in the first preferred orientation, the first preferred orientation based at least in part on the first reference point and on the axis of symmetry;

D) determining by the processor the first preferred orientation in the device frame of reference based at least in part on the rule;

E) sending the first beam of light from the light source to the first vertex point in a first beam direction and in response receiving at the device a first reflected light;

F) measuring, from the device to the first vertex point, a first target distance and a first set of the two target angles based at least in part on the first reflected light, the first target distance further based at least in part on a speed of light over a path traveled by the first beam of light;

G) determining the first beam direction in the device frame of reference based at least in part on the first set of the two target angles;

H) determining with the processor 3D coordinates of the first vertex point in the device frame of reference based at least in part on the first target distance and the first set of the two target angles;

I) executing by the processor the computer readable instructions, the computer readable instructions performing a mathematical transformation of the 3D coordinates of the first vertex point to obtain the 3D coordinates of the first sphere center in the device frame of reference, the mathematical transformation including translating the 3D coordinates of the first vertex point along the first beam direction by the first SMR depth error and along a direction perpendicular to the first beam direction, the translating along the direction perpendicular to the first beam direction being based at least in part on the first beam direction, the numerical representation of the first SMR runout error vector component, and the first preferred orientation of the first SMR; and J) storing the 3D coordinates of the first sphere center.

2. The method of claim 1 wherein, in the step of providing a processor and a memory, the processor is included in the device.

3. The method of claim 1 wherein, in the step of providing a processor and a memory, the processor is included in a computing instrument external to the device.

4. The method of claim 1 wherein:
in the step of providing a first SMR, the first SMR has a first SMR reference plane that includes the first reference point and the first axis of symmetry, there being a first SMR reference ray coincident with a line of intersection between the first SMR reference plane and the first SMR runout plane, the first SMR reference ray beginning at the first SMR intersection point and lying in a half of the first SMR reference plane that includes the first reference point, the first SMR runout error vector component having a first SMR runout reference angle, the first SMR runout reference angle being an angle between the first SMR reference ray and the first SMR runout error vector component, a length of the first SMR runout error vector component being equal to a first SMR runout error; and
in the step of storing as first stored values the first SMR depth error and a numerical representation of the first SMR runout error vector component, the numerical representation of the first SMR runout error vector component includes the first SMR runout error and the first SMR runout reference angle.

5. The method of claim 4 wherein, in the step of executing by the processor the computer readable instructions, the translating along a direction perpendicular to the first beam direction includes translating in a plane perpendicular to the first beam direction by an amount equal to the first SMR runout error in a direction given by a first beam runout reference angle relative to a first beam reference ray, the first beam reference ray coinciding with a line of intersection between a first beam reference plane and a first beam runout plane, the first beam reference ray beginning at a first beam intersection point and lying in a half of the first beam reference plane that includes the first reference point, the first beam reference plane being a plane that includes the first reference point and the first beam direction, the first beam runout plane being a plane perpendicular to the first beam direction and that includes a first beam intersection point, the first beam intersection point being a point translated from the first vertex point along the first beam direction by the first SMR depth error, the first beam runout plane being a plane perpendicular to the first beam direction and passing through the first beam intersection point.

6. The method of claim 1 wherein, in the step of providing a first SMR, the first SMR is provided with a first collar, the first collar configured to be gripped by an operator.

7. The method of claim 6 wherein, in the step of providing a first SMR, the first reference point is included on the first collar.

8. The method of claim 7 wherein, in the step of providing a first SMR, the first reference point is located on one of the group consisting of a reference mark, a serial number, a one-dimensional barcode, a two-dimensional barcode, a radio frequency identification tag, and a reflective region.

9. The method of claim 1 wherein, in the step of performing a first measurement, the first measurement includes aligning by the operator the axis of symmetry to the first beam direction.

10. The method of claim 9 wherein, in the step of providing a rule for orienting the first SMR to obtain a first preferred orientation of the first SMR, the rule is to rotate the SMR about the first axis of symmetry until the first SMR reference plane is aligned to a plane that includes a gravity vector and the first beam of light.

11. The method of claim 9 wherein, in the step of providing a rule for orienting the first SMR to obtain a first preferred orientation of the first SMR, the rule is to rotate the SMR about the first axis of symmetry until the first SMR reference plane is aligned to a plane that includes an axis of rotation of the device and the first beam of light.

12. The method of claim 11 wherein, in the step of providing a rule for orienting the first SMR to obtain a first preferred orientation of the first SMR, the axis of rotation is an azimuth axis.

13. The method of claim 11 wherein, in the step of providing a rule for orienting the first SMR to obtain a first preferred orientation of the first SMR, the axis of rotation is a zenith axis.

14. The method of claim 9 wherein, in the step of providing a rule for orienting the first SMR to obtain a first preferred orientation of the first SMR, the rule is further based on a first dimensional quantity of interest, wherein the first dimensional quantity of interest is given with respect to a first measurement line.

15. The method of claim 14 wherein, in the step of providing a rule for orienting the first SMR to obtain a first preferred orientation of the first SMR, the first dimensional quantity of interest is a first length between two points on the first measurement line, and the rule is to rotate the SMR about the first axis of symmetry until the first SMR reference ray is perpendicular to the first measurement line.

16. The method of claim 1 wherein, in the step of providing a first SMR, the first SMR further includes an information storage element.

17. The method of claim 16 further including a step of storing on the information storage element the first stored values.

18. The method of claim 17 wherein, in the step of providing a first SMR, the first SMR is provided with a first collar, the first collar configured to be gripped by an operator, the information storage element being affixed to or integrated into the collar.

19. The method of claim 16 wherein the information storage element is selected from the group consisting of a one-dimensional barcode, a two-dimensional barcode, and a radio frequency identification tag.

20. The method of claim 19 wherein, in the step of providing the device, the device further includes a storage element reader, the storage element reader configured to read the information stored in the information storage element.

21. The method of claim 17 wherein, in the step of storing on the information storage element, the information storage element is a one-dimensional or a two-dimensional barcode, and wherein, in the step of providing a device, the device further includes a camera configured to read the information storage element when the first SMR is placed in a kinematic support affixed to the device.

22. The method of claim 17 wherein the step of storing on the information storage element the first stored values further includes a step of storing an SMR serial number.

23. The method of claim 9 wherein, in the step of performing a plurality of first measurements, the operator uses an alignment tool to assist in the aligning.

24. The method of claim 23 wherein, in the step of performing a plurality of first measurements, the alignment tool includes an opaque cover that fits over the first collar, the cover including a visible mark, the visible mark being a circle or a crosshair.

25. The method of claim 23 wherein, in the step of performing a plurality of first measurements, the alignment tool includes a mirror that fits over the first collar.

26. The method of claim 24 wherein, in the step of performing a plurality of first measurements, the mirror includes a visible mark, the visible mark being a circle or a crosshair.

27. The method of claim 22 wherein, in the step of performing a plurality of first measurements, each of the first measurements include steps of sending the first beam of light from the device in a circular pattern and aligning by the operator the axis of symmetry to center the SMR on the circular pattern.

28. The method of claim 23 wherein, in the step of performing a plurality of first measurements, the alignment tool is selected from the group consisting of a reflective strip, a finger, a window onto which a circle or crosshair has been marked.

29. The method of claim 1 wherein:
the step of providing a first SMR further includes providing a first temperature sensor, the first temperature sensor affixed to the first SMR;
the step of performing a plurality of first measurements further includes measuring a first temperature of the first temperature sensor; and
in the step of executing by the processor the computer readable instructions, the 3D coordinates of the first sphere center are further based the first temperature measured by the first temperature sensor.

30. The method of claim 1 wherein, in the step of measuring, from the device to the first vertex point, a first target distance and a first set of the two target angles, the first SMR is held in contact with a first surface at a first contact point.

31. The method of claim 30 wherein the step of a making a first measurement is repeated multiple times to obtain a plurality of first measurements, the plurality of first measurements resulting in a plurality of first contact points and a corresponding plurality of first sphere centers, the plurality of first sphere centers having a corresponding plurality of 3D coordinates of the first sphere centers.

32. The method of claim 31 further including a step of selecting a first chosen contact point from among the plurality of contact points, there being a correspondence between the first chosen contact point and a first chosen sphere center point, the method including:
selecting a first subset of the plurality of first contact points;
selecting a second subset of the stored 3D coordinates of the first sphere center, each element of the second subset corresponding to an element of the first subset;
determining a first surface normal vector based at least in part on the second subset; and
determining the 3D coordinates of the first chosen contact point based at least in part on the 3D coordinates of the first chosen sphere center point, the first surface normal vector, and a first radius, the first radius being a value of the first sphere radius.

33. The method of claim 32 further including steps of:
measuring a first radius;
storing a first radius parameter, the radius parameter being the first radius or a first radius delta, the first radius delta being the first radius minus a reference value of the first radius; and
reading by the processor the first radius parameter.

34. The method of claim 15 further including storing on the information storage element the first radius parameter.

* * * * *